United States Patent
Saito et al.

(10) Patent No.: US 7,197,579 B2
(45) Date of Patent: Mar. 27, 2007

(54) DIGITAL HOME ELECTRONIC DEVICE SYSTEM FOR CHECKING IN ADVANCE IF SELECTION BY USER IS TRUSTWORTHY BASED ON WHETHER COMMAND IS DANGEROUS TO HUMAN LIFE OR SAFETY

(75) Inventors: Takeshi Saito, Tokyo (JP); Keiichi Teramoto, Kanagawa (JP); Nobuyuki Monma, Kanagawa (JP); Hiroyuki Aizu, Kanagawa (JP); Shuichi Kyuma, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 142 days.

(21) Appl. No.: 10/255,932

(22) Filed: Sep. 27, 2002

(65) Prior Publication Data

US 2003/0061380 A1    Mar. 27, 2003

(30) Foreign Application Priority Data

Sep. 27, 2001    (JP)    ............................. 2001-298531

(51) Int. Cl.
    *G06F 15/16*    (2006.01)
(52) U.S. Cl. ..................... 710/15; 710/18; 710/19; 710/72; 710/73; 707/9; 719/313
(58) Field of Classification Search .............. 710/15, 710/18, 19, 72, 73; 707/9; 719/313
See application file for complete search history.

(56) References Cited

U.S. PATENT DOCUMENTS 6,363,434 B1 * 3/2002 Eytchison ................. 719/313
6,366,912 B1 * 4/2002 Wallent et al. ................. 707/9
2002/0159601 A1 * 10/2002 Bushmitch et al. ......... 380/277
2002/0191635 A1 * 12/2002 Chow et al. ................. 370/463
2003/0009537 A1 * 1/2003 Wang ......................... 709/219

FOREIGN PATENT DOCUMENTS

| JP | 07-141542 | | 6/1995 |
| JP | 408009047 A | * | 1/1996 |
| JP | 11-146467 | | 5/1999 |
| JP | 2002-267957 | | 9/2000 |
| JP | 2001-053779 | | 2/2001 |
| JP | 2001-086479 | | 3/2001 |
| WO | WO 01/50290 | * | 7/2001 |

* cited by examiner

*Primary Examiner*—Tammara Peyton
(74) *Attorney, Agent, or Firm*—Oblon, Spivak, McClelland, Maier & Neustadt, P.C.

(57) ABSTRACT

A digital home electronic device is provided with a storing unit for storing correspondence data formed by corresponding sets of commands corresponding to classification informations for classifying a plurality of commands according to prescribed criteria, and a target device information indicating a target device which enables the digital home electronic device to execute the commands, and a command execution judgement unit for judging whether or not to execute a received command, according to the received command, a source information indicating a device which is a source of the received command, and the correspondence data, by judging whether the source information and the target device information corresponding to the received command coincide or not.

8 Claims, 15 Drawing Sheets

| COMMAND | COMMAND TYPE | CLASSIFICATION INFORMATION | TARGET DEVICE INFORMATION | |
|---|---|---|---|---|
| | | | | IP ADDRESS X |
| TEMPERATURE SETTING REQUEST | CONTROL COMMAND | POTENTIALLY HAZARDOUS TO HUMAN LIFE | HOME ELECTRONICS SERVER DEVICE | AUTHENTICATION INFORMATION |
| ..... | ..... | ..... | ..... | ..... |
| TEMPERATURE NOTIFICATION REQUEST | STATUS COMMAND | SAFE TO HUMAN LIFE | HOME ELECTRONICS SERVER DEVICE | IP ADDRESS X |
| LIQUID CRYSTAL DISPLAY | CONTROL COMMAND | | RELAY DEVICE A | IP ADDRESS $Y_A$ |
| SCREEN SWITCHING REQUEST | | | RELAY DEVICE B | IP ADDRESS $Y_B$ |
| ..... | ..... | ..... | ..... | ..... |

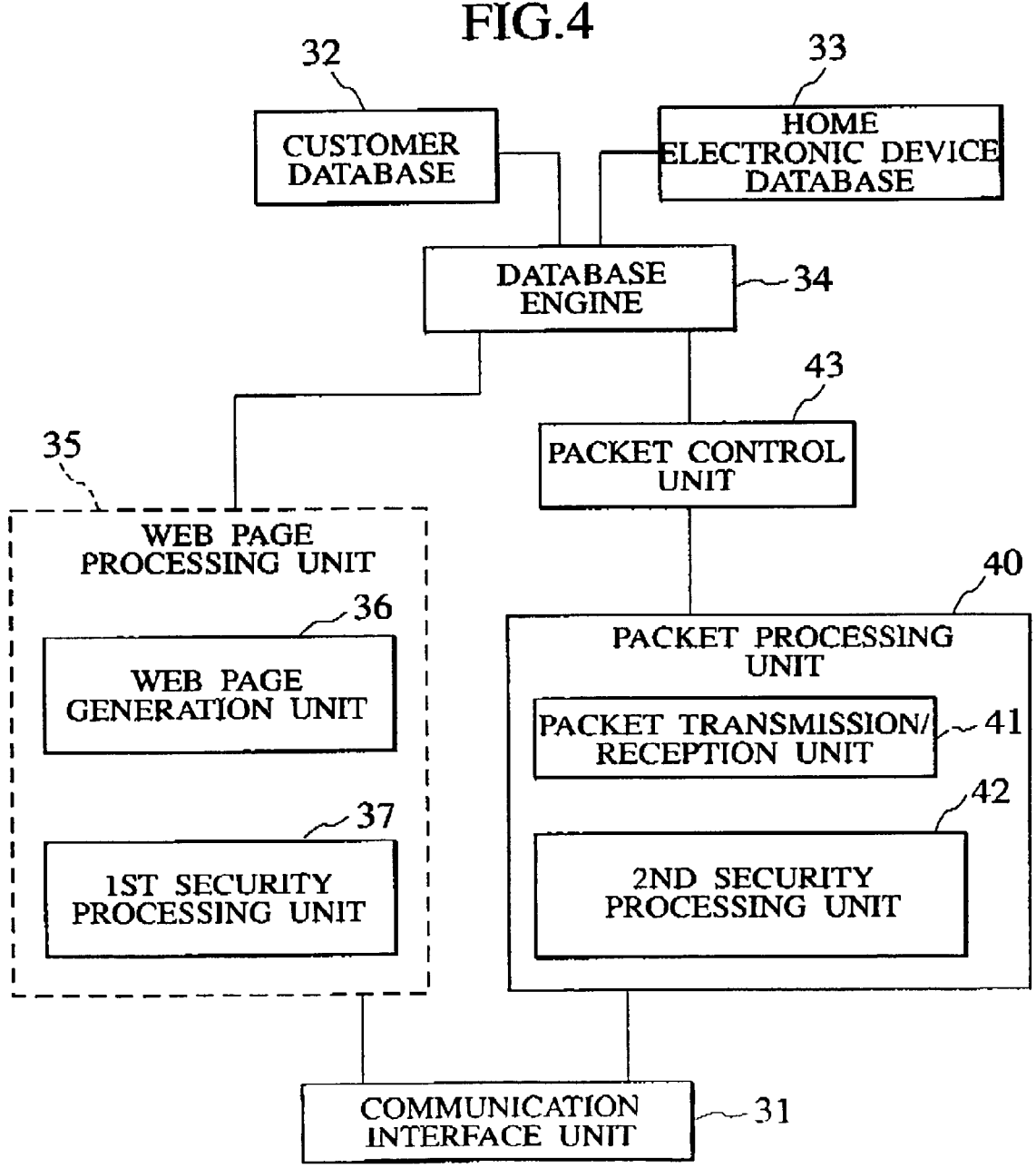

FIG.5

| USER NAME | USER INFORMATION | HOME ELECTRONICS ID | TYPE PRODUCT CODE | ACCESS | ADDRESS | REMOTE CONTROL |
|---|---|---|---|---|---|---|
| X | ADDRESS, NAME, AGE, JOB, PHONE NUMBER, PROVIDER, E-MAIL ADDRESS, PREFERENCE, ... | A | BATH BOILER XYZ-012 | IPv6 | X | NO |
| | | B | AIR CONDITIONER ABC-123 | IPv6 | Y | YES |
| | | C | ... | ... | ... | ... |
| | | D | ... | ... | ... | ... |
| | | ... | ... | ... | ... | ... |
| Y | ADDRESS, NAME, AGE, ... | YA | TV XYZ-013 | IPv6 | YA | YES |
| | | YB | ⋮ | ⋮ | ⋮ | ⋮ |

FIG.6

(REMOTE CONTROL)

| TYPE | PRODUCT CODE | TEMPERATURE NOTIFICATION REQUEST | TEMPERATURE SETTING REQUEST, ALLOWED PARAMETER | COMMAND A | · |
|---|---|---|---|---|---|
| BATH BOILER | XYZ-001 | ○ | × | × | · |
| | XYZ-002 | ○ | ○(39℃) | × | · |
| | XYZ-003 | ○ | ○(39~41℃) | ○ | · |
| | · | · | · | · | · |
| AIR CONDITIONER | ABC-123 | ○ | ○(20~25℃) | × | · |
| | ABC-124 | ○ | ○(20~25℃) | × | · |
| | · | · | · | · | · |
| | | | | | |

FIG.11

| COMMAND | COMMAND TYPE | CLASSIFICATION INFORMATION | TARGET DEVICE INFORMATION | |
|---|---|---|---|---|
| TEMPERATURE SETTING REQUEST | CONTROL COMMAND | POTENTIALLY HAZARDOUS TO HUMAN LIFE | HOME ELECTRONICS SERVER DEVICE | IP ADDRESS X |
| | | | RELAY DEVICE A | IP ADDRESS $Y_A$ |
| | | | RELAY DEVICE B | IP ADDRESS $Y_B$ |
| TEMPERATURE NOTIFICATION REQUEST | STATUS COMMAND | SAFE TO HUMAN LIFE | HOME ELECTRONICS SERVER DEVICE | IP ADDRESS X |
| | | | RELAY DEVICE A | IP ADDRESS $Y_A$ |
| | | | RELAY DEVICE B | IP ADDRESS $Y_B$ |
| COMMAND A | ... | ... | ... | ... |

27b

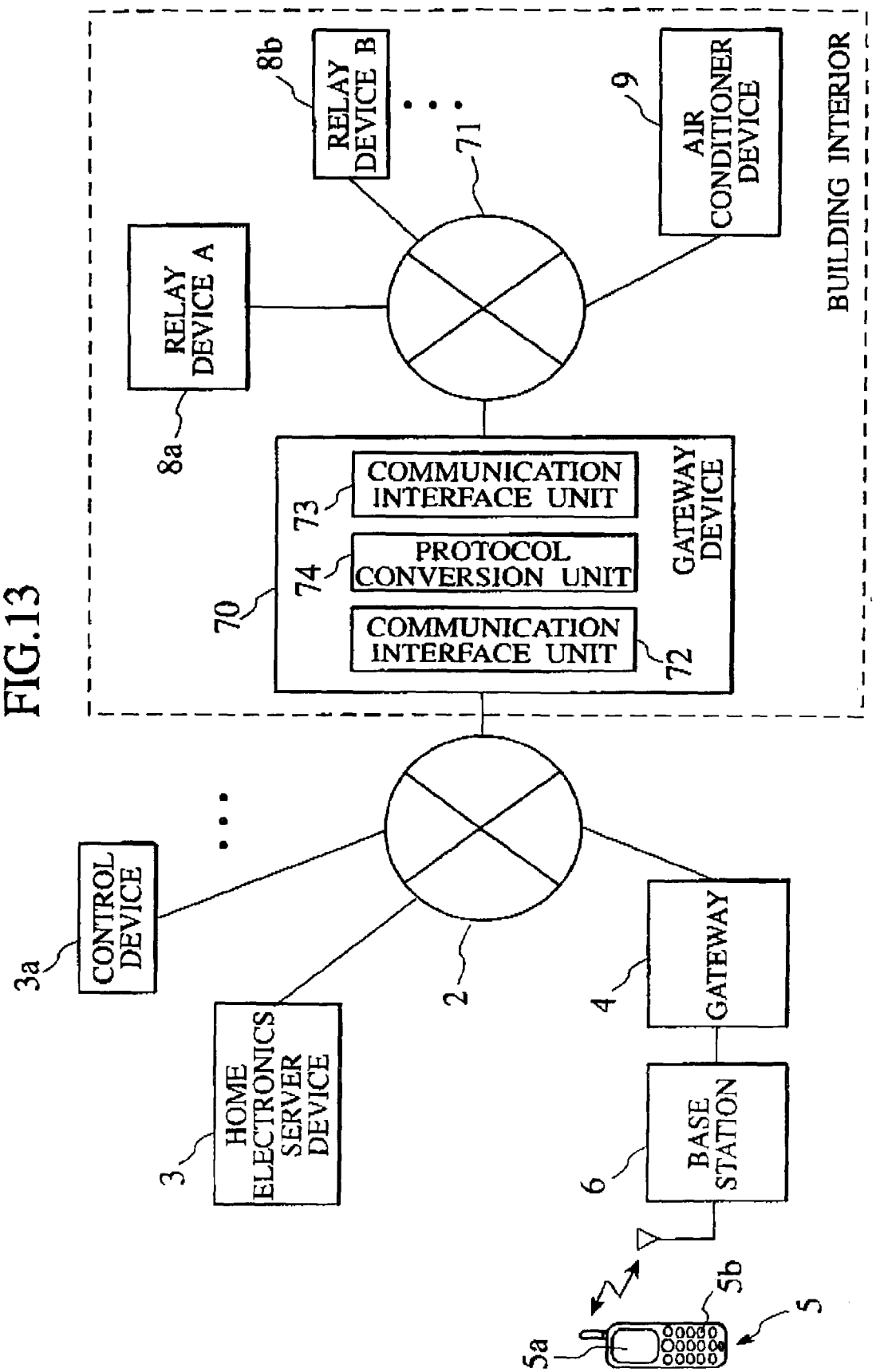

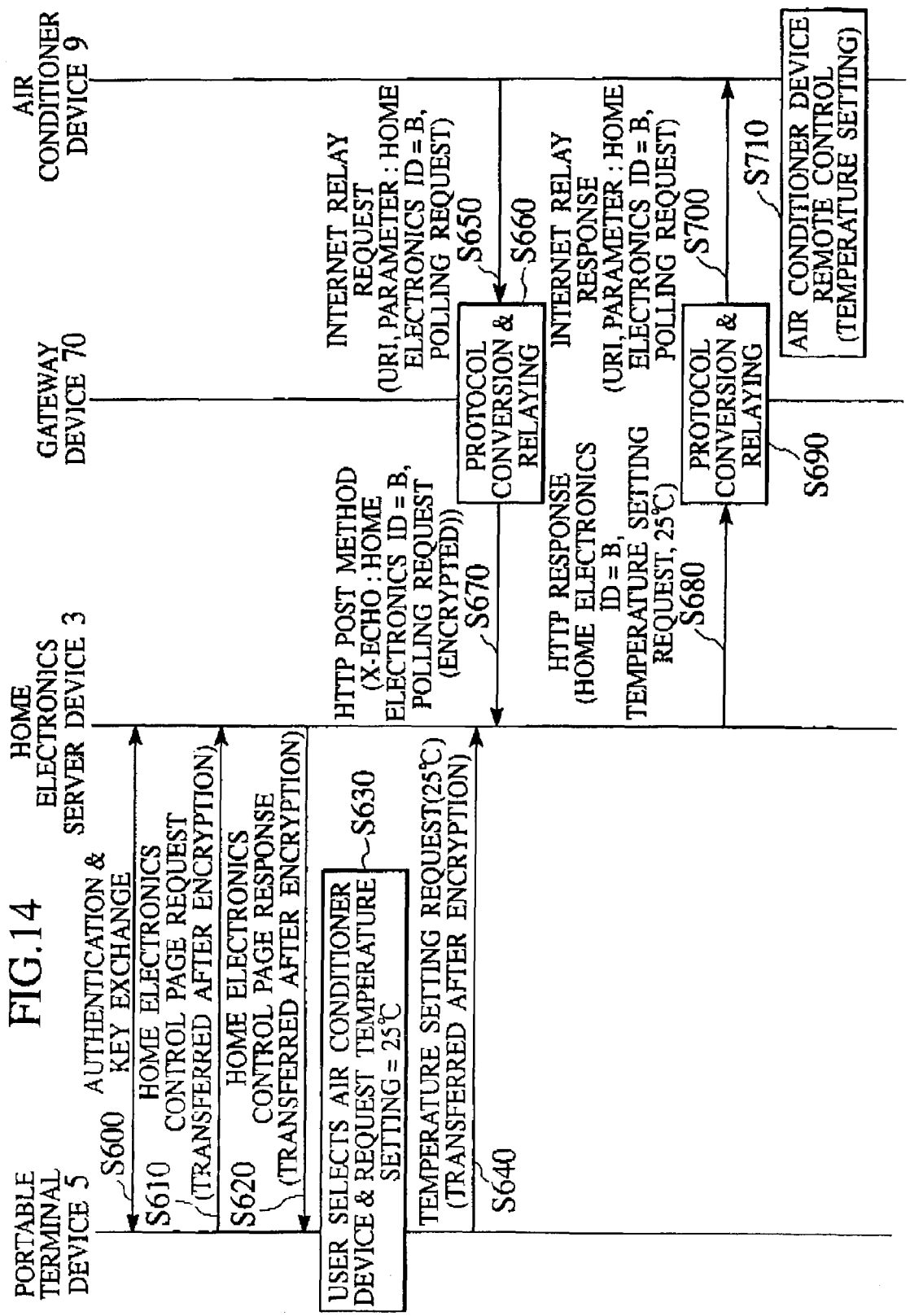

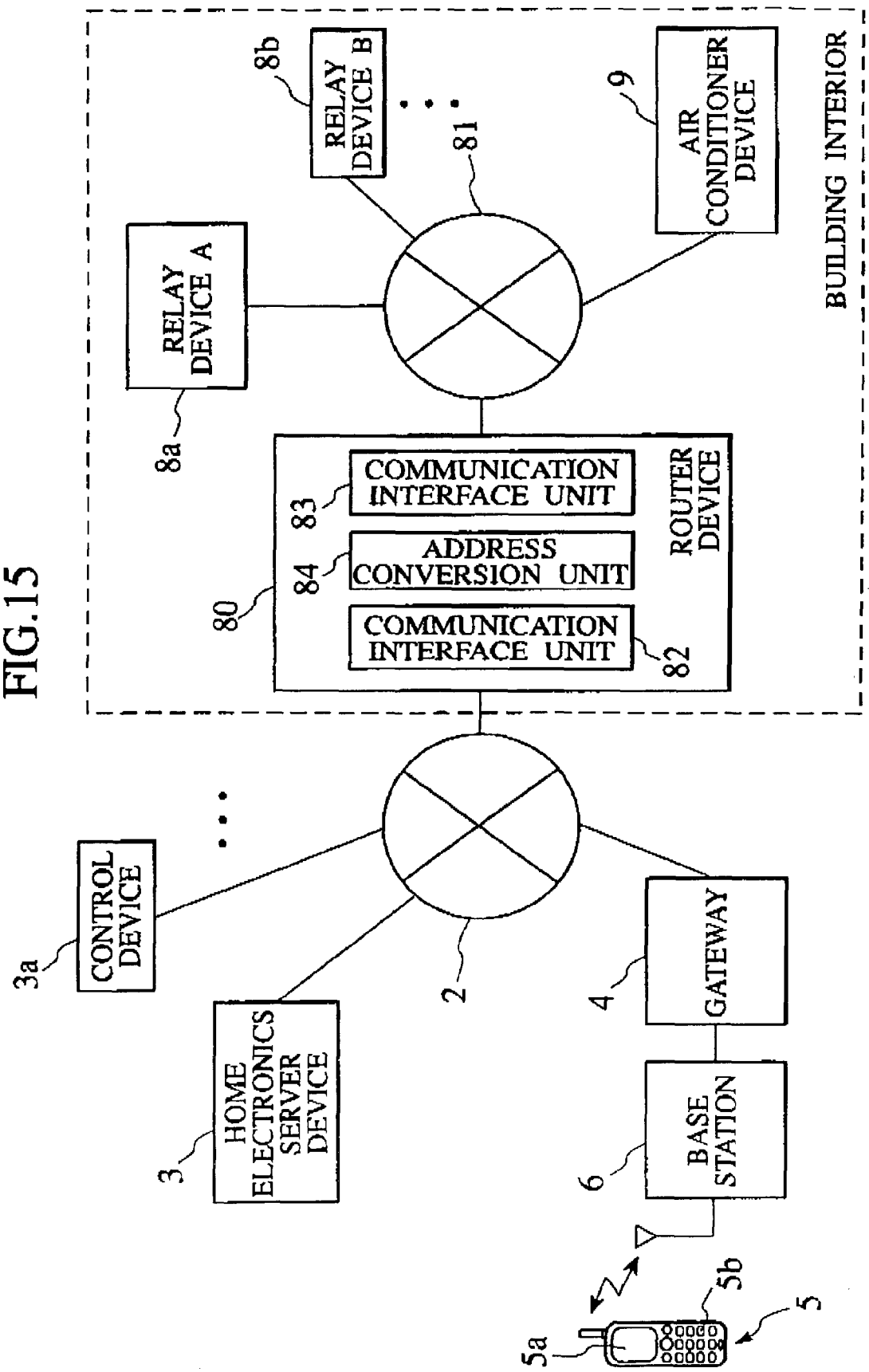

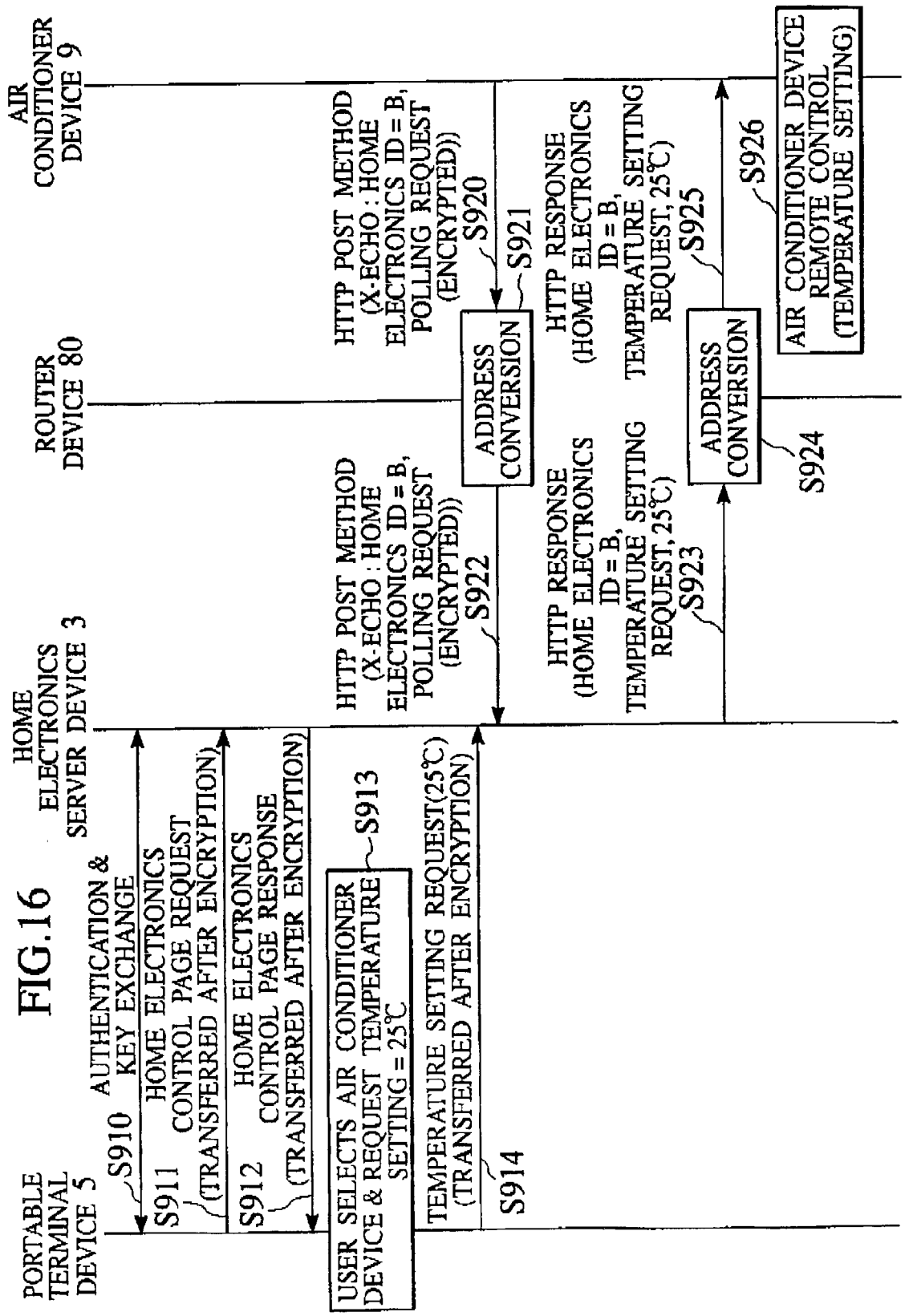

DIGITAL HOME ELECTRONIC DEVICE SYSTEM FOR CHECKING IN ADVANCE IF SELECTION BY USER IS TRUSTWORTHY BASED ON WHETHER COMMAND IS DANGEROUS TO HUMAN LIFE OR SAFETY

BACKGROUND OF THE INVENTION

1. Field of the Invention

The present invention relates to a digital home electronic device to be used on a network.

1. Description of the Related Art

In recent years, there appeared a system in which home electronic devices are connected to the network and utilized comprehensively. As a result, it has become popular to develop digital home electronic devices that are equipped with functions for communicating with other information processing devices or the like. When such digital home electronics are connected to a public network through an electric power network or a home gateway, for example, it becomes possible to manage these home electronic devices comprehensively and provide services that are not conceivable conventionally.

For example, by using such digital home electronics, it is possible to manage coolers and heaters comprehensively from a server device side in order to realize an energy saving, or manage burglar alarm devices or gas leakage detection devices comprehensively to improve the safety of the building, for example.

Also, when the server device side provides contents services to enrich the entertainment and the education, the home side can receive these services through the digital videos and sounds.

However, in the case of the public network such as the Internet, for example, there is a possibility for the malicious user to control the digital home electronics that are capable of communicating through the Internet.

For example, one of the digital home electronics is an air conditioner, and it is possible to control the temperature setting of the air conditioner through the Internet or the like from the server device side. In this case, when a malicious user controls the temperature setting of the air conditioner abnormally high, if there is only a sick person or a child who cannot adjust the setting of the air conditioner is present in that room at which the air conditioner is located, the life of that sick person or child might possibly be endangered.

BRIEF SUMMARY OF THE INVENTION

It is therefore an object of the present invention to provide digital home electronic devices that can potentially receive dangerous commands, but that can be operated safely by rejecting commands from malicious users.

According to one aspect of the present invention there is provided a digital home electronic device connected to a local network and receiving commands from devices connected to the local network or devices connected to a public network, the digital home electronic device comprising; a storing unit configured to store correspondence data formed by corresponding sets of commands corresponding to classification informations for classifying a plurality of commands according to prescribed criteria, and a target device information indicating a target device which enables the digital home electronic device to execute the commands; and a command execution judgement unit configured to judge whether or not to execute a received command, according to the received command, a source information indicating a device which is a source of the received command, and the correspondence data, by judging whether the source information and the target device information corresponding to the received command coincide or not.

According to another aspect of the present invention there is provided a digital home electronic device connected to a local network and receiving commands from devices connected to the local network or devices connected to a public network, the digital home electronic device comprising; a storing unit configured to store correspondence data formed by corresponding sets of commands corresponding to classification informations for classifying a plurality of commands according to prescribed criteria, and a target device information indicating a target device which enables the digital home electronic device to execute the commands, where the correspondence data include a plurality of the correspondence data in which a correspondence relationship between each command and each target device information is different; a selection unit configured to select the correspondence data desired by a user, among the plurality of the correspondence data; and a command execution judgement unit configured to judge whether or not to execute a received command according to the received command, a source information indicating a device which is a source of the received command, and the correspondence data selected by the selection unit, by judging whether the source information and the target device information corresponding to the received command coincide or not.

According to another aspect of the present invention there is provided a method for operating a digital home electronic device connected to a local network and receiving commands from devices connected to the local network or devices connected to a public network, the method comprising; storing correspondence data formed by corresponding sets of commands corresponding to classification informations for classifying a plurality of commands according to prescribed criteria, and a target device information indicating a target device which enables the digital home electronic device to execute the commands; and judging whether or not to execute a received command, according to the received command, a source information indicating a device which is a source of the received command, and the correspondence data, by judging whether the source information and the target device information corresponding to the received command coincide or not.

According to another aspect of the present invention there is provided a method for operating a digital home electronic device connected to a local network and receiving commands from devices connected to the local network or devices connected to a public network, the method comprising; storing correspondence data formed by corresponding sets of commands corresponding to classification informations for classifying a plurality of commands according to prescribed criteria, and a target device information indicating a target device which enables the digital home electronic device to execute the commands, where the correspondence data include a plurality of the correspondence data in which a correspondence relationship between each command and each target device information is different; selecting the correspondence data desired by a user, among the plurality of the correspondence data; and judging whether or not to execute a received command according to the received command, a source information Indicating a device which is a source of the received command, and the correspondence data selected by the selection unit, by judging whether the source information and the target device information corresponding to the received command coincide or not.

According to another aspect of the present invention there is provided a computer program product for causing a computer to function as a digital home electronic device connected to a local network and receiving commands from devices connected to the local network or devices connected to a public network, the computer program product comprising: a first computer program code for causing the computer to store correspondence data formed by corresponding sets of commands corresponding to classification informations for classifying a plurality of commands according to prescribed criteria, and a target device information indicating a target device which enables the digital home electronic device to execute the commands; and a second computer program code for causing the computer to judge whether or not to execute a received command, according to the received command, a source information indicating a device which is a source of the received command, and the correspondence data, by judging whether the source information and the target device information corresponding to the received command coincide or not.

According to another aspect of the present invention there is provided a computer program product for causing a computer to function as a digital home electronic device connected to a local network and receiving commands from devices connected to the local network or devices connected to a public network, the computer program product comprising: a first computer program code for causing the computer to store correspondence data formed by corresponding sets of commands corresponding to classification informations for classifying a plurality of commands according to prescribed criteria, and a target device information indicating a target device which enables the digital home electronic device to execute the commands, where the correspondence data include a plurality of the correspondence data in which a correspondence relationship between each command and each target device information is different; a second computer program code for causing the computer to select the correspondence data desired by a user, among the plurality of the correspondence data; and a third computer program code for causing the computer to judge whether or not to execute a received command according to the received command, a source information indicating a device which is a source of the received command, and the correspondence data selected by the selection unit, by judging whether the source information and the target device information corresponding to the received command coincide or not.

Other features and advantages of the present invention will become apparent from the following description taken in conjunction with the accompanying drawings.

BRIEF DESCRIPTION OF THE DRAWINGS

FIG. 3 is a table showing an example of correspondence data stored in a storage unit of the air conditioner device of FIG. 2.

FIG. 4 is a block diagram showing a home electronics server device in the first embodiment of the present invention.

FIG. 5 is a diagram showing a table stored in a customer database in the home electronics server device of FIG. 4.

FIG. 6 is a diagram showing a table stored in a home electronic device database in the home electronics server device of FIG. 4.

FIG. 11 is a table showing an example of second correspondence data stored in a storage unit of the air conditioner device of FIG. 10.

FIG. 13 is a block diagram showing a configuration of a home electronics control system containing a digital home electronic device according to the third embodiment of the present invention.

FIG. 14 is a sequence chart showing the remote controlling operation of the home electronics control system in the third embodiment of the present invention.

FIG. 15 is a block diagram showing a configuration of a home electronics control system containing a digital home electronic device according to the fourth embodiment of the present invention.

FIG. 16 is a sequence chart showing the remote controlling operation of the home electronics control system in the fourth embodiment of the present invention.

DETAILED DESCRIPTION OF THE INVENTION

Referring now to FIG. 1 to FIG. 9, the first embodiment of a digital home electronic device according to the present invention will be described in detail.

Figure 1:
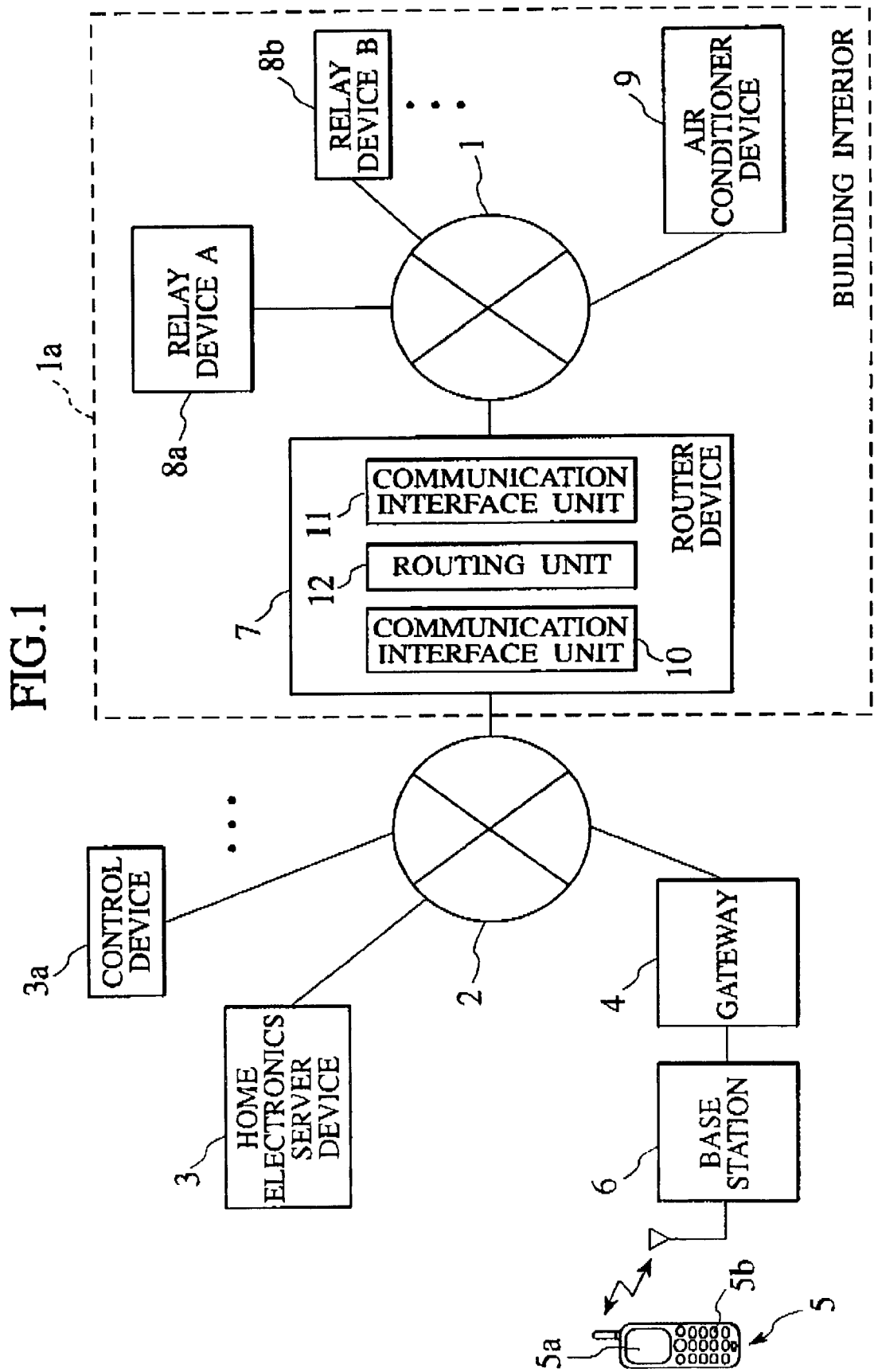
FIG. 1 is a block diagram showing a configuration of a home electronics control system containing a digital home electronic device according to the first embodiment of the present invention.

(1) Configuration:

FIG. 1 shows a configuration of a home electronics control system containing a digital home electronic device of the first embodiment. The home electronics control system comprises a local network 1 provided inside a building 1a, a home electronics server device 3 provided on a public network (Internet) 2, and a gateway device 4 connected to the local network 1 through the public network 2. Note that the home electronics control system may also have a terminal device. The gateway device 4 is a device that functions as a gateway between the public network 2 and the portable telephone network, to which a base station 6 for carrying out radio communications with a portable terminal device 5 is connected.

The local network 1 is a local network such as a home network, which is a network to which home electronic appliances are connected, for example. This local network 1 uses a radio network (802.11 or Bluetooth), for example, as the physical layer. Note that this local network 1 may be formed by a wired network such as electric power lines or Ethernet. This local network 1 has a router device 7 connected through a radio channel or the like, and relay devices 8a and 8b (other router devices, for example), and a home electronic device such as an air conditioner device 9.

The public network 2 uses the CATV Ethernet as a physical layer, for example, and is formed by a network such as the Internet for carrying out communications by using the TCP/IP protocol as an upper layer protocol.

The router device 7 has a communication interface unit 10 for carrying out communications with the public network 2, a communication interface unit 11 for carrying out communications with the local network 1, and a routing control unit 12 for controlling routing of packets transmitted from the communication interface units 10 and 11.

The routing control unit compares a destination IP address of an IP header of a packet transmitted from the communication interface unit 10 with an IP address of each home electronic device 9, for example, and carries out the packet routing processing such as that for routing the packet to the home electronic device side corresponding to the destination IP address.

The relay devices 8a and 8b contain routers, exchangers, home servers, etc. It may be possible to send commands to the digital home electronic device 3 from these relay devices 8a and 8b, or from a server device connected to an external network through these relay devices 8a and 8b.

(A) Configuration of a Digital Home Electronic Device:

In this embodiment, a configuration of an air conditioner device 9 will be described as an example of the digital home electronic device.

The air conditioner device 9 carries out radio communications with the router device 7, for example, by using the IEEE 802.11 or the Bluetooth through the local network 1.

The air conditioner device 9 is a network digital home electronic device on which the TCP/IP is implemented, To this air conditioner device 9, a unique IP address is assigned within the local network 1. Note that, in this embodiment, one air conditioner device 9 is connected to the local network 1, but when a plurality of home electronic devices are to be connected, a unique IP address is assigned within the local network 1 to each home electronic device. This IP address may be IPv4 or IPv6, but the IP addresses of the same version are used for each home electronic device and the router device 7 connected to the local network 1. Also, these IP addresses are global addresses, which are assigned without overlap among all the devices connected to the external network such as the public network 2.

Here, the description will be directed to the case where the IP addresses assigned to the air conditioner device 9, each home electronic device, the router device 7, the home electronics server device 3 and each control device 3a are of the same version in the local network 1 and the public network 2, and unique IP addresses are assigned to them.

Figure 2:
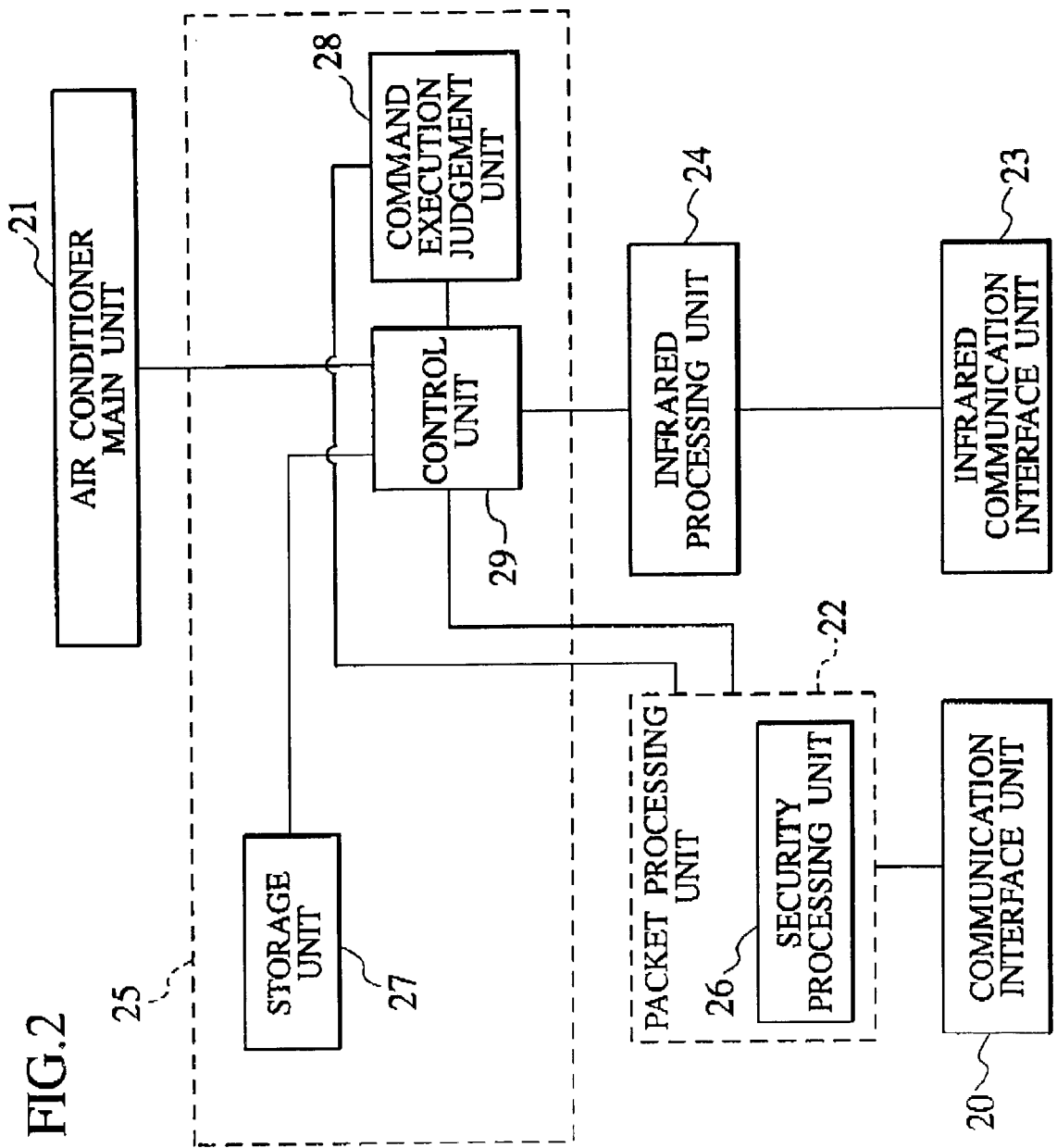
FIG. 2 is a block diagram showing an air conditioner device which is an example of the digital home electronic device according to the first embodiment of the present invention.

As shown in FIG. 2, the air conditioner device 9 has a communication interface unit 20 for carrying out communications with the router device 7 through the local network 1, an air conditioner main unit 21 for maintaining a prescribed temperature in the room at which the air conditioner device is located and for carrying out operations such as prescribed ventilation, a packet processing unit 22 for sending commands to a command execution judgement unit to be described below by analyzing packets sent through the communication interface unit 20 and generating packets to be transmitted to the local network 1, an infrared communication interface unit 23 for carrying out communications with an infrared remote controller, an infrared processing unit 24 for judging commands by analyzing infrared signals transmitted through the infrared communication interface unit 23, and an air conditioner control unit 25 for judging whether or not to execute commands according to the commands sent from the packet processing unit 22 and the source address and controlling the air conditioner main unit 21 to execute the commands.

The air conditioner main unit 21 has a temperature sensor (not shown) for measuring a temperature of the room at which the air conditioner device is located, an outdoor unit (not shown) having a heat exchanger, a ventilation unit (not shown) for making the ventilation of a prescribed temperature and a prescribed amount, and a driver unit (not shown) for checking the temperature by using the temperature sensor and driving the outdoor unit and the ventilation unit to realize the prescribed temperature according to commands given from a control unit to be described below.

The packets to be processed by the packet processing unit 22 are IP packets, each of which contains an destination IP address, a source IP address, a command, etc.

The packet processing unit 22 has a packet analysis unit (not shown) for judging a packet as destined to this device (air conditioner device 9) according to a destination IP address in the packet and analyzing data in the packet, a packet transmission and reception unit (not shown) for transmitting the packet to the communication interface unit 20, receiving the packet from the communication interface unit 20, transmitting the source address and commands to the command execution judgement unit, and receiving response sent from the control unit, a packet generation unit (not shown) for generating packets, and a security processing unit 26 (decoding unit) for applying a security processing (encryption, digital signing) to data to be sent to the home electronics server device 3 and decoding (decrypting or verifying signature) data to which the security processing is applied that are sent from the home electronics server device 3.

Note that the security processing may use a public key cryptosystem as the encryption scheme, for example. It is also possible to carry out the processing for attaching a digital signature at a time of encrypting the command such that the source can be authenticated by verifying the digital signature. By utilizing such processings, it is possible to prevent the air conditioner device 9 from executing the command from a malicious user and prevent the data alteration by the malicious user in a middle of the command transmission and reception, as will be described below. At this point, the IPSec or SSL that carries out the encryption and the authentication by utilizing IP may be used.

The air conditioner control unit 25 has a storage unit 27.

(Storage Unit)

The control commands with respect to the home electronic device can be largely classified into the commands for the so called remote controlling such as "power ON/OFF", "cooling/warming setting", "target temperature and humidity setting", etc., and commands for the so called remote monitoring such as "state monitoring", etc.

The storage unit 27 stores correspondence data that contain a corresponding set of commands set in correspondence to some classification information among classification informations for classifying a plurality of commands according to respective prescribed criteria, and a target device information indicating a target device determined in view of the classification informations which is a device that is a target for which the digital home electronic device 9 executes the commands among the control devices 3 and 3a and the relay devices 8a and 8b.

First, the commands will be described. The commands include the following.

(Status Commands)

These commands are not requests for a control of the air conditioner device 9, and they are commands to be used as a request for a notification of the state of the air conditioner device (status), its response, a command for the notification or the notification itself. For example, it is a command that requests a notification of a current power state or a current temperature.

(Control Commands)

These commands are requests for a control of the air conditioner device 9. These control commands include the following. For example, they include a request for setting a temperature of the room, a request for setting a humidity of the room, a request for setting an amount of ventilation in the room, etc.

There is also a request for switching the liquid crystal display screen provided on the air conditioner device from a "kanji" display mode to a "hiragana" display mode, etc.

The commands as described above can be classified according to the prescribed criteria as follows.

(Classification According to a Criterion as to Whether it is Potentially Hazardous to the Human Life (Hereafter Simply Expressed as Potentially Hazardous) or Not)

Here, potentially hazardous means that there is a danger when a wrong control is made by a malicious user.

As for the status commands that include a request for a notification of a current temperature, it is classified as a command that is not potentially hazardous, That the temperature sensor of the air conditioner device measures the current temperature and makes a response indicating that it is 20° C. to arbitrary device in response to the request for a notification of a current temperature, is considered to be not potentially hazardous compared with the potentially hazardous command to be described below.

Also, among the control commands, the request for switching the liquid crystal display screen provided oil the air conditioner device 9 from a "kanji" display mode to a "hiragana" display mode can be considered as not potentially hazardous.

Consequently, these commands are given the classification information indicating that they are not potentially hazardous.

Among the control commands, a command for requesting a temperature setting is classified as a potentially hazardous command. For example, when only a child or a sick person who cannot operate the infrared remote controller are present in the room at which the air conditioner device 9 is located, a command to set the temperature of the room to 40° C. can be potentially hazardous to the life of that child or sick person.

Also, in the case of the home electronic device such as a heater, a command to request the turning on of the power is classified as a potentially hazardous command. Commands such as a command to request the opening or closing of a lock of a door or a window of the home or a command to request the opening or closing of a gas stopcock are also classified as potentially hazardous commands.

Consequently, these commands are given the classification information indicating that they are potentially hazardous.

A source device that is a target from which the air conditioner device 9 receives commands and executes them (which will be referred to as a target device hereafter) is determined to have its permitted control range in view of the classification information, among the control devices 3 and 3a and the relay devices 8a and 8b.

(Target Device)

More specifically, In the case where the prescribed criterion is whether it is potentially hazardous or not, it is determined as follows.

(Case of the Command for Which the Classification Information Indicates that it is Potentially Hazardous)

For those commands for which the command classification information indicates that they are potentially hazardous, it is desirable to permit a control only from nodes that can be checked by the home electronic device in advance as "this source device is trustworthy/the safety can be checked". This is regardless of whether than source device is a node connected to the local network or a node connected to the public network. (Normally, as for a node connected to the local network, it can be judged that "it can be trusted as it is a control command that comes from within the same home", but there is a possibility that a "relay device connected to the Internet" is provided within the home and this device is remote controlled by a third person with a malicious intention. Also, there can be cases where the home electronic device does not have a way of distinguishing such a relay device and the other devices as a source device among the nodes connected to the local network.)

For this reason, in this embodiment, only the home electronics server device 3 connected to the public network 2 is regarded as the target device, i.e., a "trustworthy node". This setting may be made at a time of the shipment of the home electronic device.

Here, the reason why another arbitrary control device 3a or the like on the public network 2 is not set as the target device is because there can be cases where a malicious user sends the command (such as a request for the temperature setting of 45° C.) toward the air conditioner device 9 by utilizing the control device. Consequently, the possibility for causing the danger to the human life as the air conditioner executes the command by that malicious user is very high.

Also, the relay devices 8a and 8b of the local network 1 are also not the target device for the potentially hazardous commands. The reason for this is to prevent the potentially hazardous command by the malicious user on the public network from being transmitted to the air conditioner device 9 through the relay devices 8a and 8b such that the remote control that is malicious to the air conditioner device 9 is executed. There can also be cases where a user who is not well informed above the malicious user or the network technique to provide a router device that can easily be controlled from the external in the local network 1.

For these reasons, only a prescribed control device (the home electronics server device 3) is set as the target device for the commands for which the classification information indicates that it is potentially hazardous.

(Case of Command For Which the Classification Information Indicates that it is not Potentially Hazardous)

In this case, the target device includes devices on the local network 1 in addition to the home electronics server device 3. This can be considered as a rule that "controls from within the same home are to be accepted". In this embodiment, the target device includes the relay devices 8a and 8b of the local network 1. This is because it can be regarded that no danger will be created even when the target device is determined in this way.

However, even in this case, arbitrary control device 3a or the like that is connected to the public network 2 is not set as the target device, because it is possible to expect the case where the malicious user carries out the so called "peeping" or the like. The malicious user has a very high possibility for committing an act that has adverse influence on the operation of the air conditioner device 9 or the operation of the local network 1 through the control device or the like that is connected to the Internet, so that such an act is prevented.

From the above, in the case of the command for which the classification information indicates that it is not potentially hazardous, the target device is set to include the prescribed control device (the home electronics server device 3) and the relay devices 8a and 8b.

An exemplary correspondence data stored in the storage unit 27 in this way is shown in FIG. 3. Each command, a type of each command (whether it is a control command or a status command), each classification information (the classification information as to whether it is potentially hazardous or not) and a target device information indicating a source device which is a target for which the air conditioner device 9 executes each command are set in correspondence. Here, the target device information can be formed by attributes of each target device, its IP address, a method of authentication with that target device (including the shared information or the like) etc., as shown in FIG. 3, for example.

Note that the storage unit 27 is not necessarily limited to the configuration shown in the figure, and may be formed by storing a plurality of files distributedly, and setting them in correspondences by pointers.

Also, the target device of the command for which the classification information indicates that it is potentially hazardous is set to be the prescribed control device (home electronics server device 3), but it is also possible to add the other control device 3a and the relay devices 8a and 8b to the target device later on. It is also possible to rewrite the correspondence data stored in the storage unit 27 into another correspondence data. This can be realized, for example, by transmitting another correspondence data from the home electronics server device 3 to the air conditioner device 9, such that the control unit 29 rewrites the correspondence data in the storage unit 27 of the air conditioner device 9 by the transmitted correspondence data. In this way, it is possible to add or delete the target device that can control the operation of the air conditioner device 9.

Also, the prescribed criterion is not necessarily limited to whether it is potentially hazardous to the human life or not, and can be the others. For example, whether it is affective to the human health or not can be used as the prescribed criterion. For example, the command that request to increase the amount of ventilation in the room can be given the classification information indicating that it is affective to the human health.

Also, the prescribed criterion can be whether it has adverse effects on communications in the local network 1 or not. Among the control commands, the command that induces the denial of service for the entire local network 1 can be given the classification information indicating that it has adverse effects on communications. For example, it is a command that request to transmit the broadcast packet.

Note that, even in the case of the command classified as potentially hazardous command, it is also possible to use the criterion for judging the normal or abnormal according to the setting parameter value of the same command for the temperature setting, such that "it is reasonable if the setting temperature is 20° C. but it can be judged as abnormal if it is 40° C.". Also, "the temperature setting of ±20° C. compared with the current temperature" can be regarded as contrary to the common sense, but "the setting of about ±5° C. of the current room temperature" can be regarded as within the permissible range.

Such a provision of "defining whether the home electronic device side should accept it or not in advance depending on the meaning/parameter of the command" can be considered as a variation of the present invention.

(Air Conditioner Control Unit)

Also, the air conditioner control unit 25 has the command execution judgement unit 28 for judging whether or not to execute the command received through the communication interface unit 20 and the packet processing unit 22.

The command execution judgement unit 28 has the first command execution judgement function and the second command execution judgement function.

The command execution judgement unit 28 judges whether or not to execute the received command by judging whether the source information and the target device information corresponding to the received command coincide or not according to the received command, the source information indicating a device that is a source of the received command, the correspondence data or the authentication result or the like (the first command execution judgement function).

Also, the target device determined in view of the prescribed classification information (it is potentially hazardous to the human life, for example) among the classification informations is the prescribed control device (the home electronics server device 3), and when the prescribed command (the temperature setting request, for example) that is a command transmitted from the prescribed control device (the home electronics server device 3) and that is set in correspondence to the prescribed classification information (it is potentially hazardous to the human life, for example) is applied with the security processing (the encryption or the digital signing, for example), the command execution judgement unit 28 judges whether or not to execute the prescribed command by judging whether the source information and the target device information (the target device name or the target device address) corresponding to the decoded command coincide or not, according to the prescribed command decoded (decrypted) by the security processing unit 26, the source information indicating a device that is a source of the prescribed command (the information on a source device based on the digital signature or the source address), and the correspondence data (the second command execution judgement function). The more specific operation will be described below.

Also, the air conditioner control unit 25 has the control unit 29 for reading the correspondence data from the storage unit 27, and controls the air conditioner main unit 21 to execute the command according to the judgement to execute the command that is sent from the command execution judgement unit 28.

Also, the air conditioner device has a home electronics ID holding unit (not shown) for holding the home electronics ID. In this home electronics control system, one unique identification information (home electronics ID) is assigned to each one of all the home electronics device managed by the home electronics server device 3. This home electronics ID is managed to have no overlap even when the manufacturers of the devices are different. This home electronics ID is held to be embedded in the home electronics ID holding unit at a time of the manufacturing, for example, so as not to be altered. For example, the hardware address value such as the EUI64 address or the Ethernet address of the device is used.

Note that all kinds of commands (status commands, control commands) can be sent from the infrared remote controller to the infrared communication interface unit 23. This infrared remote controller can be assumed to be located in the same location (room) as the air conditioner device 9, and the communication path formed by this infrared is not included in the local network 1, in this embodiment based on the judgement that the malicious remote controlling from outside of the home is difficult.

(B) Home Electronics Server Device:

The home electronics server device 3 comprises an information processing device having a supplementary memory device or the like, and controls the operation of the home electronic devices connected to each network and processes requests from the portable terminal devices.

In this embodiment, the case of controlling the operation of the air conditioner device 9 at the home 1a among the home electronic devices will be described.

This home electronics server device 3 has a communication interface unit 31 for carrying out communications with the portable terminal device 5 and the air conditioner device 9 through the public network (Internet) 2, a web page processing unit 35 for creating and sending web pages with respect to a web browser (the i-mode browser, for example) functioning on the portable terminal device 5 and analyzing commands such as those of the HTTP sent from the portable terminal device 5, a customer database 32 for storing information on individual users, a home electronic device database 33 for storing information on available commands or the like for individual home electronic devices, and a database engine 34 for controlling accesses or the like with respect to these databases (FIG. 4).

The web page processing unit 35 has a web page generation unit 36 for generating web pages to be provided to the portable terminal device 5, a command analysis unit (not shown) for analyzing HTTP commands or the like sent from the portable terminal device 5, and a first security processing unit 37 for encrypting home electronics web pages to be sent to the portable terminal device 5 and decrypting commands sent in encrypted forms at the portable terminal device 5 side.

The customer database 32 stores a correspondence table for setting correspondences among a user name that is an information for identifying the individual user, a user information which is an information on that user, a home electronics ID of the home electronic device owned by this user, a type of the home electronic device, an information indicating a product code, an information (access) indicating a communication method for the home electronic device, an IP address of this home electronic device, and an information indicating whether or not the remote controlling of the home electronic device is possible, as shown in FIG. 5, for example.

By using such a configuration for the customer database 32, it is possible to retrieve a list of the home electronic devices owned by this user by using the user name or the user information as a retrieval key. Also, the customer database 32 records an access method (access) from the home electronics server device 3 to the home electronic device, an information on the IP address and name of the home electronic device, etc., in correspondence to the home electronics ID of each home electronic device.

Note that the customer database 32 is not necessarily limited to the configuration shown in the figure, and may be formed by storing a plurality of files distributedly, and setting them in correspondences by pointers.

Also, the home electronic device database 33 stores commands available to the individual home electronic device and its setting parameter range or the like, in correspondence to an information for identifying the home electronic device, as shown in FIG. 6.

Also, the home electronics server device 3 has a packet processing unit 40. The packet processing unit 40 has a packet analysis unit (not shown) for judging a packet as destined to this device according to a destination IP address in the packet and analyzing data in the packet, a packet transmission and reception unit 41 for transmitting the packet to the communication interface unit 31 and receiving the packet from the communication interface unit 31, a packet generation unit (not shown) for generating packets, and a second security processing unit 42 for applying a security processing (encryption, digital signing) to data to be sent to the home electronic device and decoding (decrypting or verifying signature) data to which the security processing is applied that are sent from the home electronic device.

Note that the home electronics server device 3 may be one that is set up by the manufacturing vendor or may be one that is not.

Note also that the home electronics server device 3 has a packet control unit 43 for making prescribed commands or the like with respect to the packet processing unit 40 and making accesses to the databases 32 and 33 through the database engine 34.

In this embodiment, the case in which one local network exists in the home 1a is described, but a plurality of local networks may exist.

(2) Operations:

The home electronic device such as the air conditioner device 9 described above is formed such that the operations can be managed according to the communication messages or the like with the external through the communication interface unit 20, For this reason, when these home electronic devices are connected to the home electronics server device 3 and they are in the operation state capable of executing the services or commands provided from the home electronics server device 3, the air conditioner device 9 will be controlled by commands from the home electronics server device 3. Here, the home electronic devices connected to the local network 1 are implemented with the TCP/IP protocol so that the air conditioner device 9 can carry out communications with the home electronics server device 3 by being connected to the Internet 2 through the router device 7.

Also, a program for accepting the remote commands is implemented in the air conditioner device 9 such that, when the command destined to the air conditioner device 9 is sent, the air conditioner device 9 becomes a state capable of executing that command. Also, the storage unit 27 of the air conditioner device 9 stores the correspondence data described above.

(Operations of the Digital Home Electronic Device According to this Embodiment)

In the following, the operation of the digital home electronic device (air conditioner device) in the home electronics control system will be described with reference to FIG. 7.

First, the air conditioner device 9, the home electronics server device 3 and the relay devices 8a and 8b are in states capable of carrying out communications.

At the step S100, the air conditioner device 9 receives a packet from the local network 1. This packet contains a source IP address, a destination IP address, and the command or the like. The command or the like may be applied with the processing such as the encryption.

The operation of the air conditioner device 9 in this step will now be described. The transmitted packet is sent to the packet processing unit 22 through the communication interface unit 20. The packet analysis unit of the packet processing unit 22 judges whether the destination address contained in the above packet coincides with the air conditioner device 9 or not. If they coincide, the source address is sent to the command execution judgement unit 28. If they do not coincide, the packet is not taken in.

At the step S110, the packet analysis unit judges whether the command contained in the packet is applied with the security processing or not. When the security processing is applied, the command is sent to the security processing unit 26. Here, when the digital signature is attached to the data, the digital signature is also sent to the security processing unit 26. After that, the operation proceeds to the step S120. If the security processing is not applied, the above command is sent to the command execution judgement unit 28 and the operation proceeds to the step S200.

At the step S120, the security processing unit 26 judges whether the digital signature is legitimate or not. If the digital signature is legitimate, this fact is sent to the command execution judgement unit 28 and the operation proceeds to the step S130. If the digital signature is not legitimate, this fact is notified to the command execution judgement unit 28, and the execution of the command is not carried out at the step S160. This is because if the digital signature is not legitimate, there is a high possibility that the command is sent by the malicious user.

At the step S130, the security processing unit 26 judges whether it is possible to decrypt the encrypted command. When the decryption is possible, the decrypted command is sent to the command execution judgement unit 28. Then, the operation proceeds to the step S140. When the decryption is not possible, there is a high possibility that the cryptosystem that is not agreed in advance is used or that the command is altered by the malicious user in a middle of the communications, so that this fact is sent to the command execution judgement unit 28. Then, the execution of the command is not carried out at the step S160.

When the encryption processing is not applied or the digital signature is not attached to the command, there are cases where the potentially hazardous command is sent by the malicious user or the content of the command is altered in a middle (of course there is also a possibility that it is an ordinary processing request from the controller within the same home). Consequently, the security processing is necessary for the potentially hazardous command.

For example, the security processing is carried out as follows, the authentication processing and the key exchange processing are carried out in advance between the air conditioner device 9 and the home electronics server device 3. Then, the command is applied with the security processing of the encryption processing and the digital signature attaching by using the public key or the like by the home electronics server device 3. Then, the security processing unit 26 of the air conditioner device 9 verifies the legitimacy of the digital signature. If it is legitimate, it can be assumed that the command transmitting device is the home electronics server device 3. Also, the security processing unit 26 decrypts the encrypted command by using the secret key or the like. This secret key may be that of the encryption scheme (the common key scheme, for example) that is agreed in advance between the home electronics server device 3 and the air conditioner device 9. If it cannot be decrypted, it can be judged that some artificiality is introduced.

Note that, here, the security processing is carried out by the command corresponding to the classification information indicating that it is potentially hazardous, and the target device corresponding to this command (the device that is permitted to transmit the control command classified as potentially hazardous) is the home electronics server device 3, so that the permitted source device becomes the home electronics server device 3, of course, there can be cases where devices other than the home electronics server device 3 are included in the target device.

At the step S140, the command execution judgement unit 28 judges whether the information indicating that it is a source device and the information of the target device (home electronics server device) corresponding to the received command coincide or not, according to the decrypted command, the information indicating that it is a source device of the command proved by the digital signature, and the correspondence data.

Note that the judgement here may be made as follows, Namely, the source address is sent to the command execution judgement unit 28 so that the command execution judgement unit 28 compares the above described source address and the target device information (the address of the home electronics server device 3) corresponding to the above described command and judges whether they coincide or not.

When they do not coincide, the command execution judgement unit 28 judges not to execute the command, and the operation proceeds to the step S160. When they coincide, the command execution judgement unit 28 judges to execute the command at the step S150, and this fact is notified to the control unit 29. The control unit 29 controls the air conditioner main unit 21 to execute the command.

On the other hand, at the step S200, the command execution judgement unit 28 judges the classification information for the transmitted command from the correspondence data, and judges whether the classification information is indicated as potentially hazardous or not. When it is not potentially hazardous, the operation proceeds to the step S210. When it is potentially hazardous, the operation proceeds to the step S160.

This is because, in this embodiment, there is a need to apply the security processing to the command that is potentially hazardous.

At the step S210, the command execution judgement unit 28 judges whether the source address and the address of the target device (the home electronics server device 3 or the relay devices 8*a* and 8*b*) corresponding to the received command coincide or not, according to the received command, the source address, and the correspondence data. For example, it registers a policy such as that the remote controlling or monitoring is made possible only from the device connected to the same local network 1 (or the home electronics server device 3).

When they do not coincide, the command execution judgement unit 28 judges not to execute the command and the operation proceeds to the step S160. When they coincide, the command execution judgement unit 28 judges to execute the command at the step S150, and this fact is notified to the control unit 29. The control unit 29 controls the air conditioner main unit 21 to execute the command.

Also, when the air conditioner device 9 does not execute the command at the step S160, a response packet for the command rejection may be transmitted to the source device according to the need. At this point, it may be notified along with the reason for not accepting, such as "it is the control command from a non-permitted node" or the like.

Note that the command execution judgement unit 28 may make the following judgement in the case where the security processing is not applied to the command corresponding to the prescribed classification information (the classification information indicating that it is potentially hazardous, for example). The command execution judgement unit 28 judges whether the classification information of the received command indicates that it is potentially hazardous or not, and if it is potentially hazardous, the operation from the step S140 on is carried out. If it is not potentially hazardous, the operation from the step S210 on is carried out. In this case, the source target device will be judged by the transmission address.

Even in this case, it is possible not to accept the potentially hazardous command by the malicious user. However, in this case, the alteration of the content of the command in a middle cannot be detected.

(Operation of the Home Electronics Control System in This Embodiment)

Figure 8:
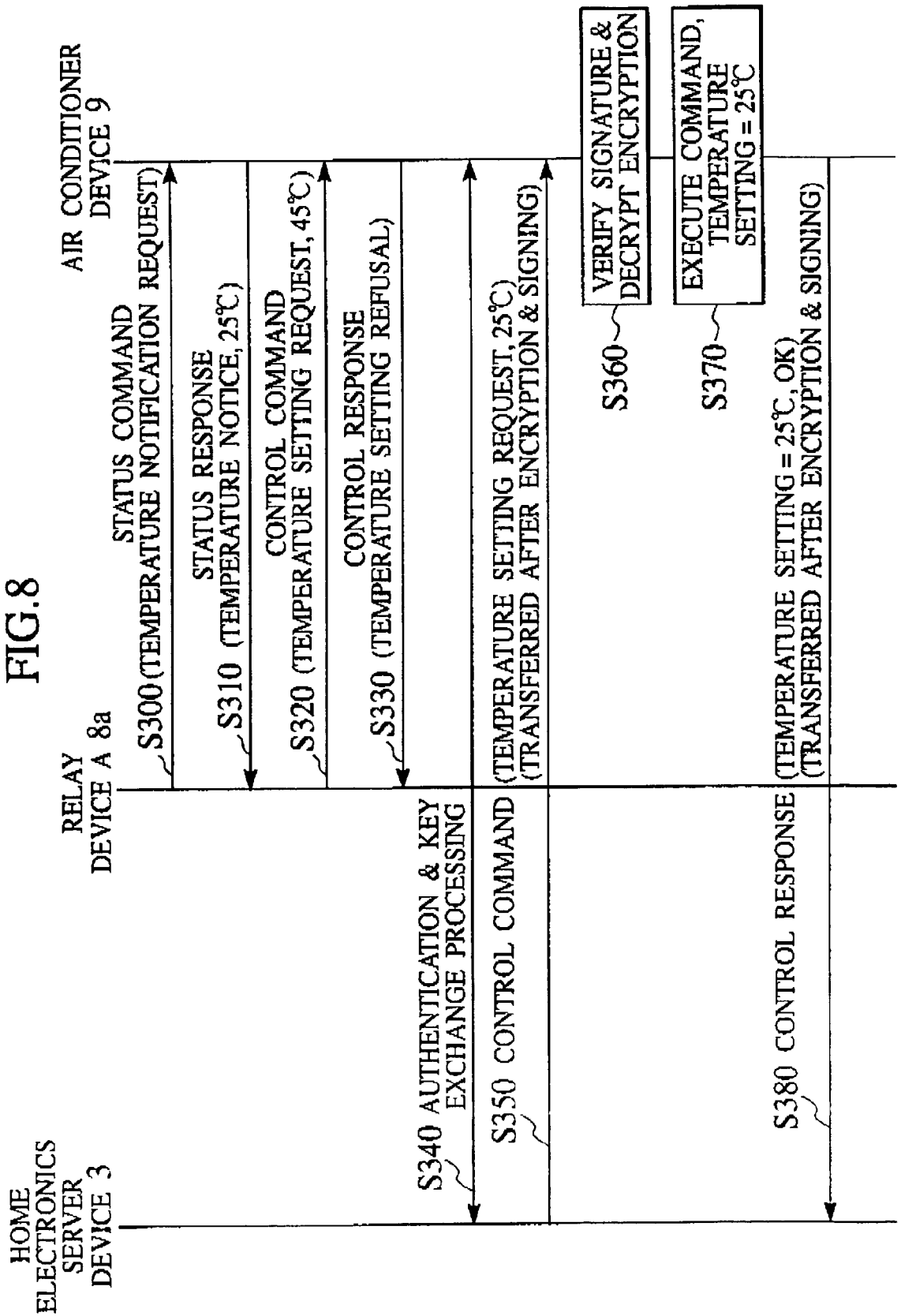
FIG. 8 is a sequence chart showing the operation of the home electronics control system in the first embodiment of the present invention.

FIG. 8 shows the operations in the case where a device that is permitted to carry out the command operation that is potentially hazardous and the case where the control is wade by a device that is not so.

(a) Case where the command is the status command:

At the step S300, the following operation is carried out. Namely, the relay device A connected to the local network 1 (the second home router device, for example) sends a packet containing the status command for the temperature notification request to the air conditioner device 9 through the local network 1.

At the step S310, the air conditioner device 9 judges that this is a command that is not potentially hazardous, and sends the status response (the notification that the temperature is 25° C.) to the relay device A.

Namely, the above described packet is sent to the packet processing unit 22 through the communication interface unit 20 of the air conditioner device 9. The packet analysis unit judges whether the security processing is applied to the command, and it is not applied in this case, so that the source address and the command are sent to the command execution judgement unit 28. The command execution judgement unit 28 reads the correspondence data from the storage unit 27 through the control unit 29. The command execution judgement unit 28 compares the source address and the address of the target device (the home electronics server device 3 and the relay devices) corresponding to the command for the temperature notification request from the correspondence data, and judges whether they coincide or not. In this case, the source address is the address of the relay device A so that the command execution judgement unit 28 judges that they coincide.

The command execution judgement unit 28 judges to execute the command, and notifies this fact to the control unit 29. The control unit 29 commands the driving unit to drive the temperature sensor to measure the temperature in the room. The information on the temperature measured by the temperature sensor is sent to the packet generation unit in the packet processing unit 22 through the control unit 29. The packet generation unit generates a packet containing the data indicating that it is the temperature notification of 25° C., the destination address (the IP address of the relay device A), the source address (the IP address of the air conditioner device 9 or the like), etc. This packet is sent to the relay device A through the packet transmission and reception unit of the packet processing unit 22, the communication interface unit 20 and the local network 1.

(b) Next, the case of the control command for which the classification information indicates that it is potentially hazardous will be described.

At the step S320, the following operation is carried out. Namely, the relay device A sends a packet containing the control command for the request of the temperature setting to 45° C. to the air conditioner device 9 through the local network 1. This command is classified as a "command that is potentially hazardous".

At the step S330, the air conditioner device 9 sends the control response indicating the temperature setting refusal to the relay device A.

Namely, the above described packet is sent to the packet processing unit 22 through the communication interface unit 20 of the air conditioner device 9. The packet analysis unit judges whether the security processing is applied to the command, and it is not applied in this case, so that the source address and the command are sent to the command execution judgement unit 28. The command execution judgement unit 28 reads the correspondence data from the storage unit 27 through the control unit 29. The command execution judgement unit 28 compares the source address (the address of the relay device A) and the address of the target device (the home electronics server device 3) corresponding to the command for the temperature setting request (the command that is potentially hazardous) from the correspondence data, and judges whether they coincide or not. In this case, the source address is the address of the relay device A so that the command execution judgement unit 28 judges that they do not coincide.

The command execution judgement unit 28 judges not to execute the command, and notifies this fact to the control unit 29. This fact is sent to the packet generation unit of the packet processing unit 22 through the control unit 29. The packet generation unit generates a packer containing the information indicating that the temperature setting refusal, the destination address (the IP address of the relay device A), the source address (the IP address of the air conditioner device 9 or the like), etc. This packet is sent to the relay device A through the packet transmission and reception unit of the packet processing unit 22, the communication interface unit 20 and the local network 1.

(c) Next, the operations of the home electronics server device 3 and the air conditioner device 9 with respect to the command that is potentially hazardous will be described.

At the step S340, the home electronics server device 3 carries our the authentication and the key exchange processing with the air conditioner device 9. For example, the home electronics server device 3 carries out the authentication processing such as the verification of the digital signature, the judgement of the legitimacy, etc., and the key exchange for the purpose of carrying out the cipher communications such as SSL, with the air conditioner device 9.

When the authentication processing and the key exchange are finished, at the step S350, the home electronics server device 3 encrypts the control command for the request of the temperature setting to 25° C., attaches the digital signature and sends it to the air conditioner device 9.

More specifically, the operation is as follows. For example, when the user X enters the command information Indicating that it is the request of the temperature setting to 25° C. for the air conditioner device 9 and the user information by a method such as the remote operations of the home electronics server device 3. The packet control unit 43 of the home electronics server device 3 acquires the home electronic device ID corresponding to the user information through the database engine 34 and the customer database 32. Then, the packet control unit 43 judges whether this home electronic device contains the air conditioner device 9 or not through the home electronic device database 33 and the database engine 34. Here the air conditioner device (product code ABC-123) Is contained, so that the packet control unit 43 acquires the available command through the database engine 34 and the home electronic device database 33. The packet control unit 43 judges whether the available command includes that which corresponds to the above described command information (the request of the temperature setting to 25° C.) or not.

As shown in FIG. 6, the command for the temperature setting request exists, so that the packer control unit 43 sends the information indicating that it is the request of the temperature setting to 25° C., the destination address (the IP address of the air conditioner device 9), and the source address (the IP address of the home electronics server device 3) to the packet generation unit of the packet processing unit 40. Also, the above described command is sent to the second security processing unit 42.

The second security processing unit 42 encrypts the above described command, attaches the digital signature, and sends it to the packet generation unit. The packet generation unit generates a packet from the address and the encrypted command transmitted, and this packet is sent to the air conditioner device 9 through the packet transmission and reception unit 41, the communication interface unit 31, the public network 2, the router device 7 and the local network 1.

At the step S360, this packet is sent to the packet analysis unit through the communication interface unit 20 and the packet transmission and reception unit. The packet analysis unit sends the encrypted command and the digital signature to the security processing unit 26. Then, when the legitimacy of the signature is checked, the security processing unit 26 sends this fact to the command execution judgement unit 28. Also, the security processing unit 26 decrypts the encrypted command and sends it to the command execution judgement unit 28.

At the step S370, the command execution judgement unit 28 reads the correspondence data from the storage unit 27 through the control unit 29, The command execution judgement unit 28 compares the information indicating the target device (the home electronics server device 3) corresponding to the received command and the information indicating that it is a source device authenticated by the digital signature from the correspondence data, and judges whether they coincide or not. In this case, the command execution judgement unit 28 judges that they coincide. The command execution judgement unit 28 judges to execute the command and notifies this fact to the control unit 29. The control unit 29 sends the command for the temperature setting to 25° C. to the driving unit. The driving unit drives the air conditioner main unit 21 such that the room temperature becomes equal to 25° C.

At the step S380, the security processing unit 26 encrypts the information indicating that the temperature setting to 25° C. is executed, and attaches the digital signature. Then, this information is sent to the packet generation unit, and the packet generation unit generates a packet from the source address (the IP address of the air conditioner device 9), the destination address (the IP address of the home electronics server device 3), the encrypted information, and the digital signature. This packet is sent to the home electronics server device 3 through the packet transmission and reception unit, the communication interface unit 20, the local network 1, the router device 7 and the public network 2.

When the legitimacy of the digital signature is checked and the decryption processing is carried out at the home electronics server device 3, It can be seen that the command is executed at the air conditioner device 9.

(Operation of the Home Electronics Control System Including the Portable Terminal Device 5)

The operation in this case will be described with reference to FIG. 9. Note that the same operation can be realized by using a terminal device (that is permitted in advance) of the same user connected to the Internet.

Here, the operations that are identical to those of FIG. 8 are given the same reference numerals and their description is omitted.

When the user commands the utilization of the remote control service, the portable terminal device 5 executes the log-in processing with respect to the home electronics server device 3 (S400), in this log-in processing, the portable terminal device 5 transmits the authentication information to the home electronics server device 3. When the authentication information is checked as the legitimate one, the home electronics server device 3 carries out the key exchange for the purpose of the cipher communications such as SSL, with the portable terminal device 5, for example.

When the key exchange is finished, the web browser of the portable terminal device 5 requests the transmission of data (the home electronics control page) for commanding the remote control of the air conditioner device 9, with respect to the web page processing unit 35 (S410).

In response to such a request, the web page processing unit 35 searches through the databases 32 and 33 through the database engine 34, to see if the corresponding user owns the air conditioner device 9 and if that air conditioner device 9 has the remote control function, etc., and when the user owns the air conditioner device 9, the web page processing unit 35 supplies data in which the input entry or the command selection input and the like is defined, for example, as the data of the home electronics control page, to the web browser of the portable terminal device 5 (S420).

When such data are supplied, the web browser displays the image according to the data at a display unit 5a. In this image, a display for urging the input of the temperature to be set is contained for the temperature setting request, for example, and when the user requests to make the setting temperature to be 25° C. with respect to this image, by pressing keys "2" and "5" provided at the input unit 5b, for example (S430), a message indicating that the setting temperature of the air conditioner device 9 is set to be 25° C. is generated, and this message is encrypted and transmitted to the home electronics server device 3 (S440).

When such a temperature setting request is received, the database engine 34 acquires the information such as the method of access to the air conditioner device 9 of the user (access in FIG. 5), the address, etc., from the correspondence table of the customer database 32. The security processing unit 42 of the packet processing unit 40 executes the authentication and key exchange processing with the air conditioner device 9 by using the acquired access method (S450).

Then, the operations of the steps S380 to S380 are carried out.

Then, the home electronics server device 3 transfers the fact that the command is executed, to the portable terminal device 5 (S460), and the fact that the remote control succeeded is displayed by the display unit 5a (S470).

Note that, in the home electronics control system of this embodiment, the case of using the air conditioner device 9 as the digital home electronic device that accepts the command that is potentially hazardous is described, but of course, it is not necessarily limited to this case. For example, the digital home electronic device may be a bath boiler for controlling the temperature of the water in the bath tub, an entrance management device for managing opening and closing of a lock of an entrance, a gas stopcock management device for managing opening and closing of a gas stopcock, a window management device for managing opening and closing of a window, or a sound volume management device for managing a sound volume of an audio device, etc. The configuration and the operation of the air conditioner device 9 of this embodiment can be similarly applied to these devices as well.

(Effects)

According to this embodiment of the present invention, the storage unit 27 stores the correspondence data in which the commands corresponding to the classification informations and the target device information are set in correspondence. Then, the command execution judgement unit 28 judges whether the command should be executed or not by judging whether the source information and the target device information corresponding to the received command coincide or not, from the received command, the source information, and the correspondence data. For this reason, when the classification information indicates that it is potentially hazardous to the human life, for example, the storage unit stores the correspondence data in which the target device is limited to be a specific device, such that it becomes possible to prevent the execution of the command by the malicious user from the unknown source device.

Consequently, the digital home electronic device that accepts the command that is potentially hazardous can be prevented from receiving the command by the malicious user so that it becomes possible to provide the digital home electronic device that can be operated safely.

(Modifications)

Note that, in this embodiment, when the Echonet protocol is also implemented at each home electronic device besides the TCP/IP protocol, the communications in the local network 1 may be exchanged by the Echonet packets. Here, the Echonet is a protocol that can be used by the interfaces between the electrically powered home electronic devices such as air conditioner and the refrigerator. In the Echonet, those which carry out communications by using radio channels and those which carry out communications by using wired channels such as electric power lines are defined, By using such an Echonet, the cooperative operation and the centralized management of the home electronic devices become possible. The Echonet packets include a destination Echonet address, a source Echonet address, and data such as a property (command).

In this case, as the addresses of the relay devices 8a and 8b in the target device information of the air conditioner device 9, the Echonet addresses are used in addition to the IP addresses (and the home electronics IDs are contained in the case where each home electronic device cannot be specified by the Echonet address alone).

Note that, in this embodiment, each device connected to the local network 1 is implemented with the TCP/IP protocol and the Echonet protocol.

In this way, the air conditioner device 9 can identify the source relay devices 8a and 8b, etc., from the Echonet packets.

Also, the air conditioner device 9 executes the prescribed command (The status command, for example) from the device (the relay devices 8a and 8b, etc.) connected to the local network 1. On the other hand, the air conditioner device 9 is operated by a policy such as "the remote controlling and the remote monitoring from the public network 2 are accepted only from the home electronics server device 3" or "as for the remote controlling and the remote monitoring from devices connected to the local network, only the remote controlling by the Echonet packets are permitted", in order to realize not to execute the command from the control device 3a connected to the public network 2 (except for the home electronics server device 3). It is possible to use a method in which the Internet packets are received once, but not executed unless the source is the home electronics server device 3.

Figure 10:
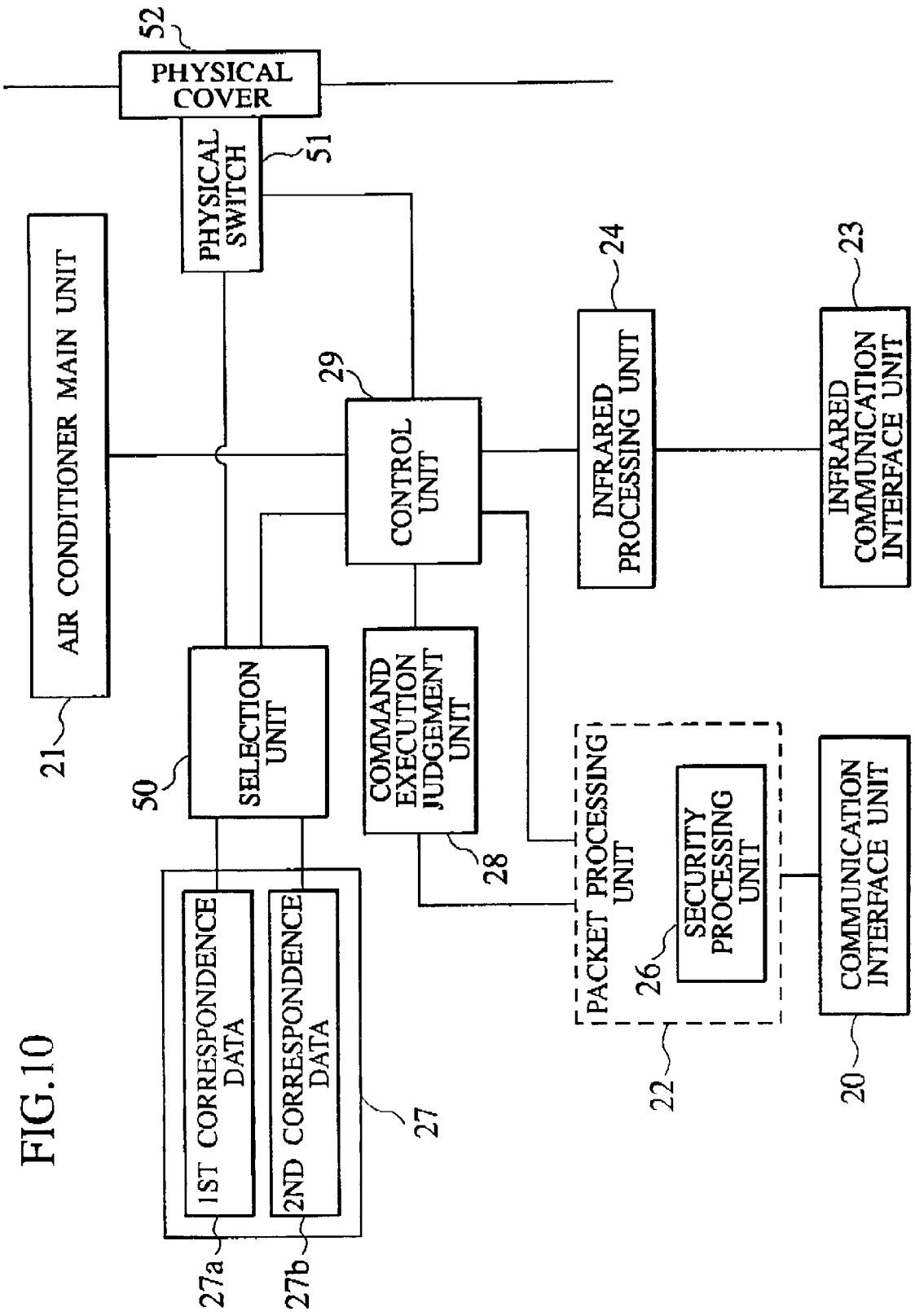
FIG. 10 is a block diagram showing an air conditioner device which is an example of the digital home electronic device according to the second embodiment of the present invention.
Figure 12:
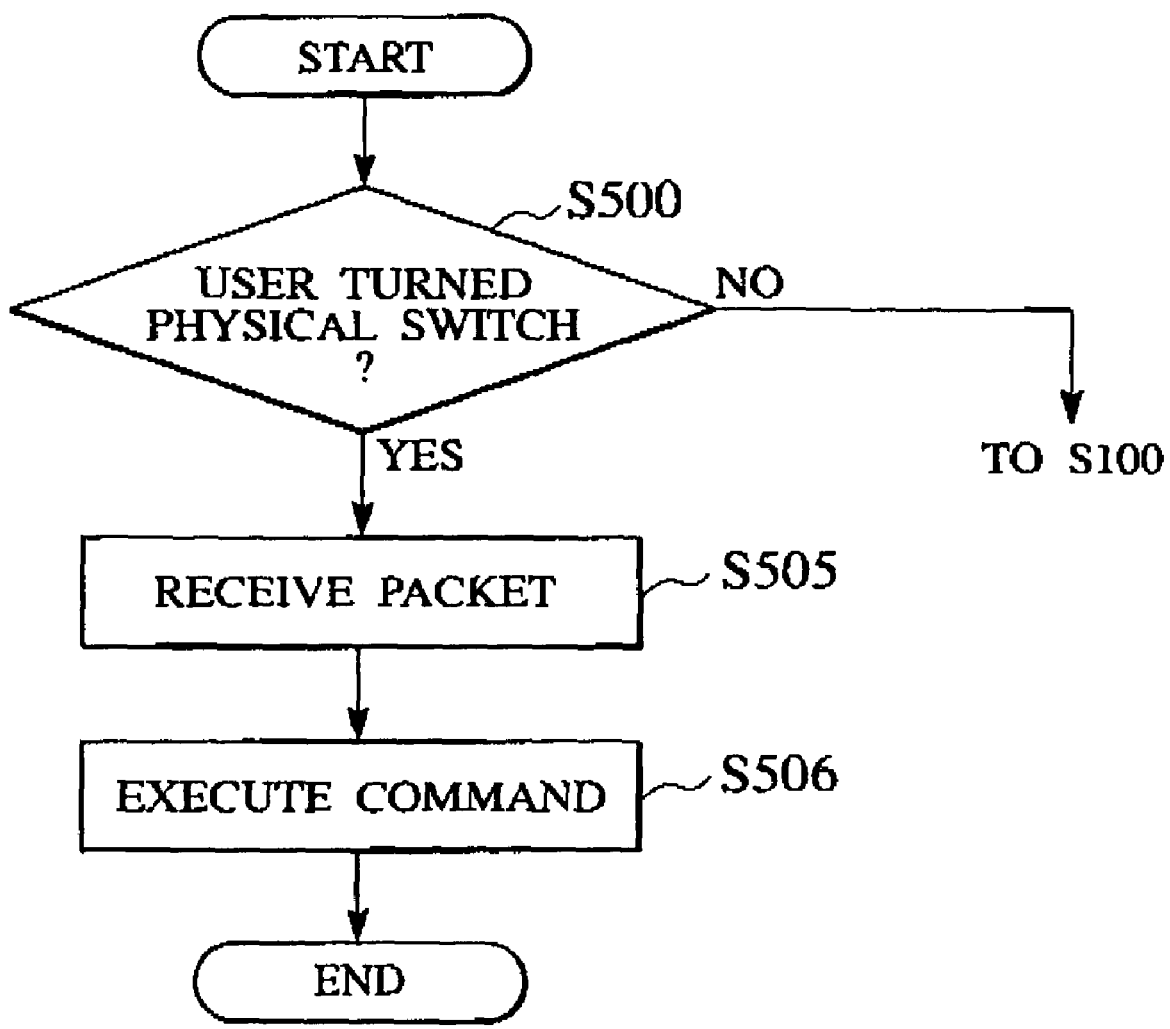
FIG. 12 is a flow chart showing a part of the operation of the home electronic device according to the second embodiment of the present invention.

Referring now to FIG. 10 to FIG. 12, the second embodiment of a digital home electronic device according to the present invention will be described in detail.

In the digital home electronic device of the first embodiment, the source device for accepting the prescribed command (the temperature setting request, for example) is set to be a single home electronics server device 3. In this way, the safe operation of the digital home electronic device can be secured.

However, when a home network is formed inside each building and the air conditioner device is connected to that network as a part of the building automation, for example, depending on the users, there can be cases where it is desired to control the air conditioner device of each building from the central control device other than the home electronics server device 3. Similarly, when a home network is formed inside each chain store and the air conditioner device is connected to that network, there can be cases where it is desired to control the air conditioner device of each store from the central control device other than the home electronics server device 3.

Also, there can be cases where the user familiar with the network technology wishes to control the air conditioner device 9 from a home server by accessing the home server at his home directly by his own setting, under his own responsibility. In such cases, it is quite inconvenient if the air conditioner device 9 can be controlled only from a single home electronics server device 3.

For this reason, the digital home electronic device (the air conditioner device, for example) of this embodiment can accept the commands from a device other than the home electronics server device 3, for the prescribed command (the command that is potentially hazardous such as the temperature setting request, for example) that is set up to the air conditioner device of the user.

Note that, in this embodiment, whether the air conditioner device accepts the prescribed command (the temperature setting request) from a device other than the home electronics server device 3 or not is determined by the user's intention. For this reason, there is a need to prevent the air conditioner device from accepting the above described command from a device other than the home electronics server device 3 against the user's intention.

In the configuration of the digital home electronics control system of this embodiment, the elements and the functions identical to those of the first embodiment are given the same reference numerals and their description is omitted.

The home electronics control system of the second embodiment differs from the home electronics control system of the first embodiment in that the configuration and the operation of the digital home electronic device (the air conditioner device, for example) are different. In the following, the configuration of the air conditioner device will be described first, (1) Configuration of a Digital Home Electronic Device According to the Second Embodiment:

FIG. 10 shows a configuration of a digital home electronic device according to the second embodiment. Here, the exemplary case of the air conditioner device will be described.

In this embodiment, the digital home electronic device has the storage unit 27 for storing a plurality of correspondence data 27a and 27b, a selection unit 50 for selecting one of the plurality of the correspondence data stored in the storage unit 27, a physical switch unit (which will be referred to as a physical switch hereafter) 51 that is provided to be embedded inside the air conditioner device 9 for indicating which correspondence data should be selected to the selection unit 50 by the switching operation according to a desire of the user, and a physical cover unit 52 for covering the physical switch 51. Tile rest of the configuration is similar to that of the first embodiment.

The storage unit 27 stores the plurality of correspondence data in which the correspondence relationship between each command and each target device information is different. Here, the case of using two correspondence data will be described.

The first correspondence data 27a is the same as the correspondence data of the first embodiment. Namely, as shown in FIG. 3, in the first correspondence data 27a, each command, a type of each command (the control command or me status command), each classification information (the classification information indicating that it is potentially hazardous or not), and the target device information indicating a device that is a target for which the air conditioner device executes each command, are set in correspondence.

The second correspondence data differs from the first correspondence data 27a as follows. Namely, as shown in FIG. 11, the target device corresponding to each command is different. For example, even for the command that corresponds to the classification information indicating that it is potentially hazardous (the temperature setting request), unlike the first correspondence data, the target device includes the devices (the relay devices A and B, etc.) connected to the local network 1 in addition to the home electronics server device 3.

The physical switch 51 is arranged such that it cannot carry out the switching operation unless the physical cover unit 52 is opened. However, it is sufficient to make it impossible to switch unless the user or the air conditioner provider attempts to switch the physical switch 51 with the explicit intention, and the configuration and the arrangement of the physical switch 51 and the physical cover unit 52 (the arrangement inside the air conditioner device) are not limited to any particular ones. The condition on the configuration and the arrangement is such that the switching operation of the physical switch 51 cannot be made easily against the user's intention, by the mischief or the child or by the cleaning of the air conditioner device, for example. As the physical cover unit 52, a cover for the filter change may be used, for example, Then, it is sufficient to have the physical switch 51 provided in a form of being embedded inside the air conditioner device 9 when the cover is opened.

Also, in this embodiment, the physical switch 51 has the initial setting at a time of the shipment of the air conditioner device 9 such that the selection unit 50 selects the first correspondence data.

There can be cases where the user who is not familiar with the network technology to use the air conditioner device 9 without making any setting to the physical switch 51. Even when such a user use the air conditioner device without making any setting, when the initial setting is made as described above, it is possible to prevent the air conditioner device from accepting the potentially hazardous command from the malicious user against the user's intention.

(2) Operations of the Digital Home Electronic Device (the Air Conditioner Device) According to the Second Embodiment:

The operations of the digital home electronic device (the air conditioner device) of this embodiment will be described with reference to FIG. 12. In FIG. 12, the same operations as those of the first embodiment are given the same reference numerals and their description is omitted.

At the step S500, the user opens the physical cover unit 52, and judges whether the physical switch 51 should be switched from the initial setting or not.

Figure 7:
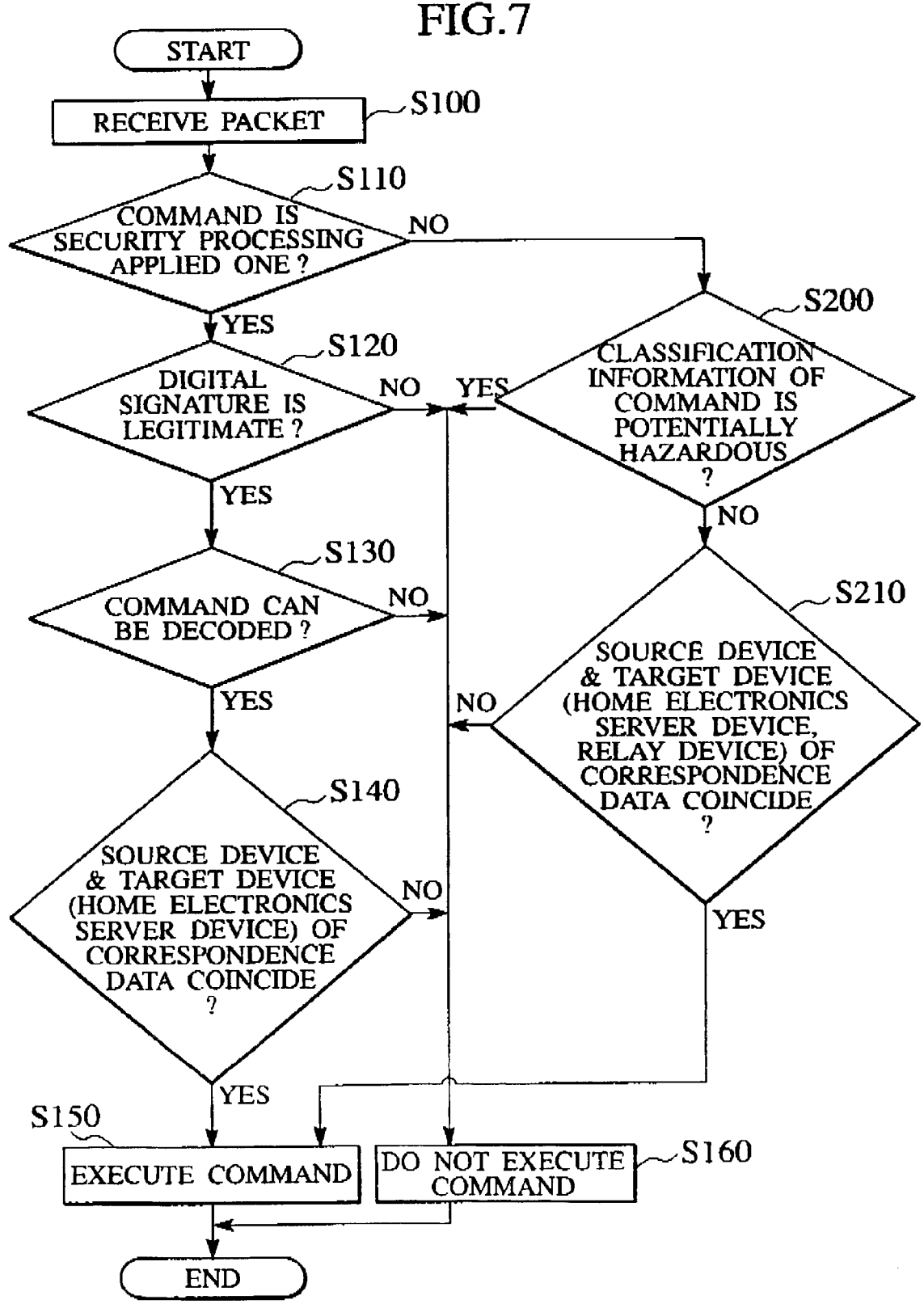
FIG. 7 is a flow chart showing the operation of the home electronic device according to the first embodiment of the present invention.

In the case of not switching, the operations from the step S100 on in FIG. 7 of the first embodiment are carried out. In the case of switching, the correspondence data are the second correspondence data 27b, and the execution of even the command that is potentially hazardous is permitted to the devices connected to the local network 1.

First, when the physical switch is switched (S500), the physical switch 51 sends a signal indicating that the second correspondence data are specified to the selection unit 50. In this way, the selection unit 50 selects the second correspondence data 27b. In the second correspondence data, as shown in FIG. 11, the target device of the command that is potentially hazardous is extended to include the home electronics server device 3 and the devices (the relay devices 8a and 8b in this case) in the local network 1.

Then, the above described command is executed as long as the source device is the target device (the home electronics server device 3 or the device connected to the local network 1), even if it is the command that is potentially hazardous (S505 to S506), Then, the selection unit 50 initially selects the first correspondence data, and when the physical cover is opened and the physical switch 51 is switched, another correspondence data are selected. For this reason, even if the user forger to make the setting, it is possible to prevent the air conditioner device from accepting the command that is potentially hazardous against the user's intention. Also, the selection of the correspondence data is changed by the switching operation of the physical switch 51, so that the switching can be made easily even by the user who is not well informed about the network technology.

Note that, in this embodiment, the case of using two correspondence data is described, but it is not necessarily limited to this case. It can be similarly applicable to the case where a plurality of the correspondence data are to be stored in the storage unit 27. Also, when the storage unit 27 stores the correspondence data in which the target device corresponding to the command that is potentially hazardous is a device desired by the user rather than all the devices connected to the local network 1, for example, it is possible to limit the target device of the command that is potentially hazardous to be the desired device and the home electronics server device 3. Also, when the storage unit 27 stores the correspondence data in which a control device desired by the user is added as the target device corresponding to the command that is potentially hazardous, and the selection unit 50 selects this correspondence data, the control device desired by the user can be included in the target device (the device that can transmit the command that is potentially hazardous) even if it is a device on the public network 2.

(Modifications)

As the control of the selection operation by the selection unit 50, the following method may be used.

First, there are cases using the infrared remote controller. When the correspondence data to be selected can be entered by the infrared remote controller, when the information indicating one correspondence data is entered, this information is sent to the infrared processing unit 24 through the infrared communication interface unit 23. The infrared processing unit 24 judges the information indicating the correspondence data and sends it to the control unit 29. The control unit 29 sends this information to the selection unit 50, and the selection unit 50 selects the entered correspondence data according to that information. At this point, it is safe to use the selection unit 50 in which the setting can be changed only when the complicated operation such as the simultaneous pressing of two specific buttons is made, for example, such that the switching cannot be made by the simple operation.

Next, there are cases where the home electronics server device 3 sends a command for specifying the correspondence data to be selected by the selection unit 50. The method for realizing this case is the same as the first embodiment. Namely, the command is encrypted, the digital signature is attached, and it is sent from the home electronics server device 3 to the air conditioner device 9. When the air conditioner device 9 received this command, the legitimacy of the digital signature is checked, the command is decrypted, and when it is judged that the source device and the target device coincide, the control unit 29 sends this command to the selection unit 50. The selection unit 50 selects the correspondence data according to the command sent from the home electronic server device 3.

Note that the method for switching the selection unit 50 may be such that it can be switched by a control command from a device connected to the local network (such as a home server, for example) as well, but there is a need to be very careful to make the setting such as "whether a device that is requesting the switching is a trustworthy device or not".

Referring now to FIG. 13 and FIG. 14, the third embodiment of a digital home electronic device according to the present invention will be described in detail.

In the digital home electronic device of the first and second embodiments, the TCP/IP protocol is implemented in the home electronic devices to be connected to the local network 1 such as the air conditioner device 9, and an IP address is assigned to each home electronic device. However, in the Echonet, it is not absolutely necessary to implement the protocol such as TCP/IP in each device, so that there can be cases of using a configuration in which the connection to the network is made through a gateway device 70 for carrying out the conversion of the Echonet protocol and the protocol such as the TCP/IP.

(Configuration)

In the home electronic control system according to the third embodiment, as shown in FIG. 13, a local network 71 is provided instead of the local network 1. In this local network 71, unlike the local network 1 described above, It is possible to carry out communications by the Echonet protocol. Namely, devices connected to the local network 71 are not necessarily carrying out communications by the TCP/IP protocol, and they are carrying out communications by using the Echonet protocol as the protocol for the purpose of the home electronics control.

To the air conditioner device 9 connected to this local network 71, an IP address is not assigned unlike the first and second embodiments. For this reason, the local network 71 has a gateway device 70 for converting the Echonet protocol and the TCP/IP protocol.

This gateway device 70 has a communication interface unit 72 for making a connection to the public network 2, a communication interface unit 73 for making a connection to the local network 71, and a protocol conversion unit 74 for carrying out the protocol conversion. This gateway device 70 carries out the relaying of the messages or the like from the air conditioner device 9 destined to the home electronics server device 3, between the public network 2 and the local network 71, for example.

In the Echonet used in the local network 71, the data are transmitted and received in units of packets. This Echonet packet comprises a header portion and a payload portion. The header portion stores an Echonet address which is an identification information for identifying a destination device, an Echonet address which is an identification information for identifying a source device. Also, the payload portion contains the information indicating that it is a source device, d property (corresponding to the command), etc.

In this embodiment, each home electronic device in the Echonet 71 can be identified by the Echonet address and the home electronics ID, for example.

On the other hand, the TCP/IP packet used in the Internet 2 comprises a header and a payload. The header stores an IP address of a destination device, an IP address of a source device, a transmission target port number, etc. Also, the payload stores the prescribed data, etc.

In order to carry out the conversion of the Echonet packet and the TCP/IP packet as described above, the gateway device 70 has the protocol conversion unit 74. The protocol conversion unit 74 has a correspondence table for the purpose of carrying out the conversion of the TCP/IP packet and the Echonet packet, and sends the Echonet packet or the Internet packet generated by the protocol conversion according to this correspondence table, to the public network 2 or the local network 71 through the communication interface units 72 and 73. Also, as the Echonet command, a command implying "transfer this payload with respect to this URI" is defined, such that when the Echonet device (the air conditioner device 9 in this embodiment) wishes to transmit arbitrary packet with respect to a specific node (the home electronics server device 3 in this embodiment) on the public network (Internet) 2, this command will be used. For this reason, the protocol conversion unit 74 may have a mechanism by which the payload portion of the packet is basically not converted but transferred as it is.

In the correspondence table, the destination address (the IP address and the URI information, for example) and the TCP port number on the public network 2 side of the home electronics server device 3, and the Echonet address and the home electronics ID of the air conditioner device 9 for carrying our communications with the home electronics server device 3 are set in correspondence. Consequently, the data sent to a specific port of the gateway device 70 from the home electronics server device 3 can be forwarded to the air conditioner device 9 by referring to this correspondence table. Note that the property (corresponding to the command) in the payload of the Echonet packet and the command in the payload of the Internet packet are also set in correspondence according to the need.

In this home electronics control system, the protocol conversion between the public network 2 and the local network 1 is possible by the gateway device 70 in such a configuration. Although the packet conversion and the protocol conversion are carried out at the gateway device 70, one-to-one communications can be carried out at a level of the applications executed at the home electronics server device 3 and the air conditioner device 9 as a result.

Now, the packet conversion between the public network 2 and the local network 1 is made possible. As a result, from the air conditioner device 3 connected to the local network 1, the communications can be started by specifying the URI or the like of the home electronics server device 3. However, from the home electronics server device 3, only the IP address and the port number of the gateway device 70 can be specified, so that the home electronics server device 3 cannot start the communications by directly specifying the air conditioner device 9 that is a correspondence, in a state where the prescribed port number in the TCP/IP and the Echonet address of the air conditioner device 9 are set in correspondence at the gateway device 70 in advance.

For this reason, in this home electronics control system, the communications are started from the side of the air conditioner device 9 that receives the remote controlling, with respect to the home electronics server device 3 at a prescribed interval. Such a transmission operation at a prescribed interval is called polling. This polling uses the HTTP protocol in this embodiment. This is because the HTTP can be considered as the best access protocol from the air conditioner device 9 to the home electronics server device 3 as it is set to be capable of carrying out communications usually even in the NAT environment or the IP masquerade environment.

The air conditioner device 9 that carries out the polling receives a message when there is a response from the home electronics server device 3 with respect to the polling, but when there is no response within a prescribed time (that is, when the content of the response packet is null), the air conditioner device 9 waits until the next time for the polling.

The home electronics server device 3 ignores the polling (makes the null response) if there is no need for the transmission with respect to the air conditioner device 9, but when there is a need for the transmission of information with respect to the air conditioner device 9, the home electronics server device 3 starts the transmission as a response to the polling. In this home electronics control system, the start of the communications from the home electronics server device 3 side is effectively realized by such a polling processing.

Here, the customer database 32 of the home electronics server device 3 stores the information as to whether the direct communications are possible or the polling is necessary as an access indicating the method of communications up to the home electronic devices in order to provide services, under the environment in which the home electronic devices that require the polling processing and the home electronic devices that are capable of the direct communications by the TCP/IP protocol are coexisting. When the polling is necessary, the information indicating that fact and the information indicating the polling interval are stored, for example.

When the direct communications are possible, the customer database 32 stores the IP address of the air conditioner device 9, but when the polling processing is required, the Echonet address of the air conditioner device 9 may be stored. Also, the IP address and the port number of the gateway device 70 that is necessary in order to access that home electronic device are also stored. Note that it is also possible to use a mechanism such that the Echonet address of the air conditioner device 9 is unknown before the polling, but when the polling is made, the Echonet address defined in the payload of the TCP/IP packet for that polling is extracted and stored as the address in the customer database 32.

(Operation)

First, the air conditioner device 9 searches for a relay device that has a network relaying function (a function for forwarding packets to the public network 2). The attribute notification requests are sequentially issued to the detected relay devices, and the relay device (the gateway device 70) having the network relaying function is detected. After that, the attribute notification request is issued to the gateway device 70, and a response to it is sent to the air conditioner device 9. In this way, the air conditioner device 9 learns that a device having the relaying function is the gateway device 70.

When the program for accepting the remote controlling is installed into the air conditioner device 9 and the command destined to the air conditioner device 9 is sent, the air conditioner device 9 is assumed to be in a state capable of executing the command.

Figure 9:
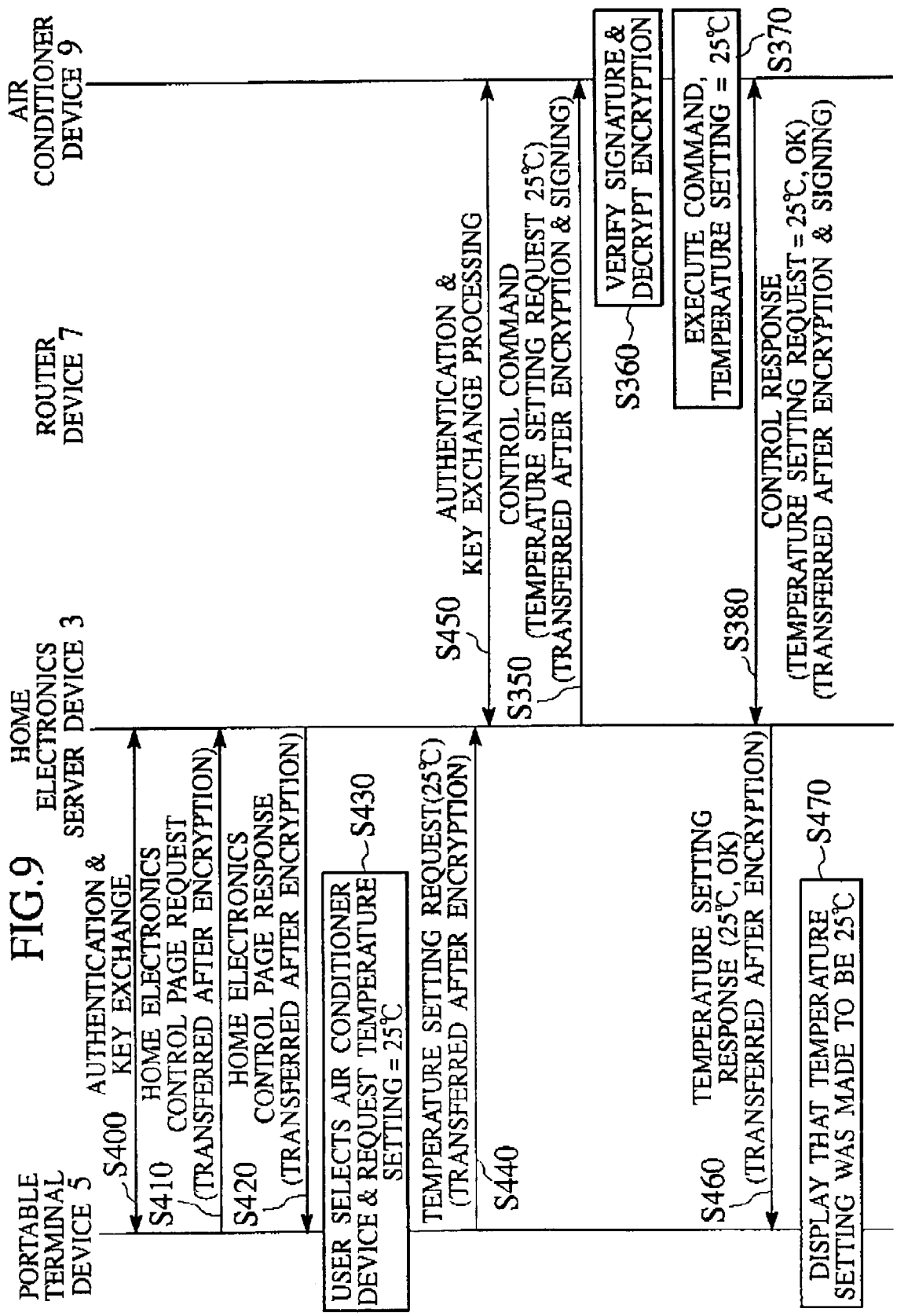
FIG. 9 is a sequence chart showing the remote controlling operation of the home electronics control system in the first embodiment of the present invention.

In this home electronics control system, as shown in FIG. 14, similarly as the processing from S400 to S440 in FIG. 9 described above, the authentication and the key exchange of the portable terminal device 5 (S600), the request for transmitting the home electronics control page to the web page processing unit 35 (S610), the providing of the home electronics control page (S620), the command input (S630), and the processing up to the transmission of the setting request (S640) are executed.

After that, the database engine 34 acquires the access method up to the air conditioner device 9 of the user and the address information from the correspondence table in the customer database 32.

In this case, the communications up to the air conditioner device 9 require the polling processing, so that the home electronics server device 3 waits until the packet from the air conditioner device 9 (S650) is applied with the protocol conversion (S660) and provided (S670). When the polling packet is supplied, the home electronics server device 3 transmits the temperature setting request destined to the air conditioner device 9 to the gateway device 70 as a response to this packet (S680).

Also, the home electronics server device 3 can learn the port number of the gateway device 70 related to the correspondence table from the packet transmitted by the polling processing.

In the packet transmitted by the home electronics server device 3, the header portion contains the IP address of the home electronics server device 3 as a source address, and the IP address and the port number of the gateway device 70 as a destination address, while the payload portion contains the information indicating that a source if the home electronics server device 3, the information on the command for the request of the temperature setting to 25° C., etc.

This packet is relayed by the gateway device 70 (S690). The gateway device 70 generates the Echonet packet by applying the protocol conversion to this packet.

More specifically, the gateway device 70 generates the Echonet packet by referring to the correspondence table. In this packet, the header portion comprises the Echonet address of the gateway device 70 as a source address and the Echonet address of the air conditioner device 9 as a destination address. Also, the payload portion comprises the command for the request of the temperature setting to 25° C., the information indicating that the source is the home electronics server device 3, etc. This Echonet packet is sent to the air conditioner device 9 (S700).

The packet analysis unit of the packet processing unit 22 of the air conditioner device 9 judges the transmitted Echonet packet is destined to this device according to the Echonet address and the home electronics ID, and sends the information indicating the source device and the command among the payload data to the command execution judgement unit 28. The command execution judgement unit 28 judges that the source device is the home electronics server device 3 from the information indicating the source device in the Echonet packet.

The command execution judgement unit 28 reads the correspondence data from the storage unit 27 through the control unit 29. The command execution judgement unit 28 compares the information of the target device (the home electronics server device 3) corresponding to the above described command and the information indicating the source device from the correspondence data, and judges whether they coincide or not. In this case, the command execution judgement unit 28 judges that they coincide. The command execution judgement unit 28 judges to execute the command, and notifies this fact to the control unit 29. The control unit 29 sends the command for the request of the temperature setting to 25° C. to the driving unit. The driving unit drives the air conditioner main unit 21 such that the room temperature becomes equal to 25° C. (S610).

From the above, it is possible to control the air conditioner device 9 as the home electronics server device 3 sends the command by utilizing a response message for a single polling processing from the air conditioner device 9 to the home electronics server device 3.

(Effects)

In this home electronics control system, as described above, in the case of controlling the air conditioner device 9 from the home electronics server device 3, the polling (once in every 30 seconds, for example) from the air conditioner device 9 to the home electronics server device 3 is waited, and transmits the command as a response with respect to this polling.

For this reason, in the third embodiment, the following effects are obtained in addition to the effects of the first embodiment. Namely, in this home electronics control system, it is possible to send the command and control the home electronic device for which the communications cannot be started from the home electronics server device 3 because the communications cannot be carried out by the protocol used in the external network such as the Internet.

Also, in this home electronics control system, the command can be issued at latest at the period of the polling from the home electronic device to the home electronics server device 3, so that by setting up the polling period appropriately, it is possible to contribute to the improvement of the responsiveness easily.

Note that, even in this embodiment, the same air conditioner device 9 as that of the second embodiment can be formed (except for the protocol to be used), and the same operation can be carried out.

Also, when the home electronics ID are assigned in overlap, each home electronic device can be identified by the Echonet address, the home electronics ID and the session number.

Referring now to FIG. 15 and FIG. 16, the fourth embodiment of a digital home electronic device according to the present invention will be described in detail.

In the network inside the home, there are cases where the local addresses are used and the router device is equipped with an address conversion unit such as NAT in order to make connections to the external network. Also, the address conversion unit becomes necessary when the IP address versions of the network inside the home and the external network are different. When such an address conversion unit is used, even if the common protocol (TCP/IP) is implemented at the home electronics server device 3 and the air conditioner device 9 as in the first embodiment, there are cases where the communications between them cannot be directly carried out in this state.

(Configuration)

In the home electronics control system according to the fourth embodiment, as shown in FIG. 15, a local network 81 is provided instead of the local network 1. In this local network 81, the communications are carried out by the TCP/IP protocol, for example, For this reason, the IP address is assigned to each home electronic device connected to the local network 81. However, the IP addresses used in the local network 81 are private IP addresses which are not globally unique IP addresses, unlike the first embodiment.

In this home electronics control system, a router device 80 is provided instead of the router device 7 of FIG. 1. This router device 80 has a communication interface unit 82 for carrying out communications with the public network 2, a communication interface unit 83 for carrying out communications with the local network 81, and an address conversion unit 84 for applying the processing such as the address conversion, for example.

This address conversion unit 84 carries out the relaying of packets by carrying out the conversion between the address system used in the external network (such as the global addresses or IPv4, for example) and the address system used in the internal network (such as the private addresses, link local addresses, or IPv6, for example). More specifically, the address conversion operation is carried our as follows. For example, in the case of the conversion between the global addresses and the private addresses, it is carried out by the processing of the NAT or the like. Alternatively, the address conversion may be carried out by the processing that also carries out the conversion of the correspondence relationship of the upper protocols (port numbers) of the network addresses.

For example, the address conversion unit 84 can carry out the address conversion by using an address conversion table in which the IP address (IPv4) of the home electronics server device 3 and the IP address (IPv6) of the air conditioner device 9 for carrying out the communications with the home electronics server device 3 are set in correspondence.

Here, the direct accesses from the public network 2 to the local network 81 are limited by the above described address conversion. Consequently, in this home electronics control system, similarly as in the case of the third embodiment, the home electronics server device 3 cannot start the communications by directly specifying the IP address of the air conditioner device 9. For this reason, in this home electronics control system, the home electronic device for accepting the command carries out the polling with respect to the home electronics server device at a prescribed time interval.

(Operation)

First, the air conditioner device 9 searches for the relay device having the network relaying function, similarly as in the third embodiment. Then, when the program for accepting the remote controlling is installed Into the air conditioner device 9 and the command destined to the air conditioner device 9 is sent, the air conditioner device 9 becomes a state capable of executing the command.

In this home electronics control system, as shown in FIG. 16, similarly as the processing from S500 to S540 in FIG. 14 described above, the authentication and the key exchange of the portable terminal device 5 (S910), the request for transmitting the home electronics control page to the web page processing unit 35 (S911), the providing of the home electronics control page (S912), the command input (S913), and the processing up to the transmission of the setting request (S914) are executed.

After that, the database engine 34 acquires the access method up to the air conditioner device 9 of the user and the address information from the correspondence table in The customer database 32.

In this case, the communications up to the air conditioner device 9 require the polling processing, so that the home electronics server device 3 waits until the packet from the air conditioner device 9 (S920) is applied with the address conversion (S921) and provided (S922). When the polling packet is supplied, the home electronics server device 3 transmits the temperature setting request destined to the air conditioner device 9 to the router device 80 as a response to this packet (S923).

In the packet transmitted by the home electronics server device 3, the header portion contains the IP address (IPv4) of the home electronics server device 3 as a source address, and the IP address (IPv4) and the port number of the router device 80 as a destination address, while the payload portion contains the information indicating that a source if the home electronics server device 3, the information on the command for the request of the temperature setting to 25° C., etc.

This packet is relayed by the router device 80 (S924) The router device 80 generates the packet by applying the address conversion to this packet.

More specifically, the router device 80 generates the packet having the header portion formed by the source address (the IP address (IPv6) of the router device) and the port number, and the destination address (the IP address (IPv6) of the air conditioner device 9 or the like), and the payload portion formed by the command for the request of the temperature setting to 25° C., the information indicating that a source is the home electronic server device 3, etc., by referring to the address conversion table, and sends it to the air conditioner device 9.

The packet analysis unit of the packet processing unit 22 of the air conditioner device 9 judges the transmitted packet is destined to this device according to the destination IP address, and sends the information indicating the source device and the command among the payload data to the command execution judgement unit 28.

The command execution judgement unit 28 judges that the source device is the home electronics server device 3 from the information indicating the source device in the packet. The command execution judgement unit 28 reads the correspondence data from the storage unit 27 through the control unit 29. The command execution judgement unit 28 compares the information of the target device (the home electronics server device 3) corresponding to the above described command and the information indicating the source device from the correspondence data, and judges whether they coincide or not. In this case, the command execution judgement unit 28 judges that they coincide. The command execution judgement unit 28 judges to execute the command, and notifies this fact to the control unit 29. The control unit 29 sends the command for the request of the temperature setting to 25° C. to the driving unit. The driving unit drives the air conditioner main unit 21 such that the room temperature becomes equal to 25° C. (S926).

From the above, it is possible to control the air conditioner device 9 as the home electronics server device 3 sends the command in response to a single polling processing from the air conditioner device 9 to the home electronics server device 3.

(Effects)

In this embodiment, the same effects as the third embodiment can be achieved. Note that, even in this embodiment, the same air conditioner device 9 as that of the second embodiment can be formed, and the same operation can be carried out.

According to the present invention, the storage unit stores the correspondence data in which the commands corresponding to the classification informations and the target device information are set in correspondence. Then, the command execution judgement unit judges whether the command should be executed or not by judging whether the source information and the target device information corresponding to the received command coincide or not, from the received command, the source information, and the correspondence data. For this reason, when the classification information indicates that it is potentially hazardous to the human life, for example, the storage unit stores the correspondence data in which the target device is limited to be a specific device, such that it becomes possible to prevent the execution of the command by the malicious user from the unknown source device.

Consequently, the digital home electronic device that accepts the command that is potentially hazardous can be prevented from receiving the command by the malicious user, so that it becomes possible to provide the digital home electronic device that can be operated safely.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the digital home electronic device of each of the above described embodiments can be conveniently implemented in a form of a software package, Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A digital home electronic device connected to a local network and receiving commands from devices connected to the local network or devices connected to a public network, the digital home electronic device comprising:

a storing unit configured to store a plurality of correspondence data each formed by correlating each command with one piece of target device information, wherein the target device information indicates source devices permitted to send the correlated commands respectively in the correspondence data, the commands are classified according to classification information describing prescribed criteria in the correspondence data, and the source devices indicate nodes checked by the digital home electronic device in advance, as trustworthy nodes in the local network and/or the public network;

a selection unit configured to select the correspondence data desired by a user, among the plurality of the correspondence data, according to a switching operation of the user;

a command execution judgement unit configured to judge whether or not to execute a received command according to the received command, a source information indicating a source device which sends the received command, and the correspondence data selected by the selection unit, by judging whether the source information and one particular piece of the target device information correlated with the received command in the correspondence data coincide or not; and a main unit configured to carry out a prescribed operation according to the received command in a case in which the received command is executed;

wherein the main unit is connected to the storing unit and the command execution judgement unit via an inner interface, and the prescribed criteria include at least one criterion indicating whether or not an execution of a command by the digital home electronic network is dangerous to a human life or safety.

2. The digital home electronic device of claim 1, wherein the plurality of the correspondence data includes one correspondence data in which the target device determined in view of one particular piece of the classification information among a plurality of the classification information is a prescribed control device, a prescribed command transmitted from the prescribed control device is applied with a security processing, the digital home electronic device also has a decoding unit configured to decode the prescribed command to which the security processing has been applied, and the command execution judgement unit judges whether the source information and one particular piece of the target device information correlated with the prescribed command in the correspondence data coincide or not, according to the prescribed command decoded by the decoding unit, the source information indicating the prescribed control device which sends the prescribed command, and the one correspondence data selected by the selection unit, in case of judging whether or not to execute the prescribed command.

3. The digital home electronic device of claim 2, wherein the plurality of the correspondence data includes another correspondence data in which the target device determined in view of another particular piece of the classification information among a plurality of the classification information includes the prescribed control device and all devices connected to the local network that transmit the commands, a prescribed command transmitted from the prescribed control device or a device on the local network is applied with a security processing, and the command execution judgement unit judges whether the source information and one particular piece of the target device information correlated with the prescribed command in the correspondence data coincide or not, according to the prescribed command decoded by the decoding unit, the source information indicating the prescribed control device or the device on the local network which sends the prescribed command, and the another correspondence data selected by the selection unit, in case of judging whether or not to execute the prescribed command.

4. The digital home electronic device of claim 1, further comprising a physical switch unit configured to switch a selection by the selection unit.

5. The digital home electronic device of claim 4, wherein the physical switch unit is provided to be embedded inside the digital home electronic device and has a physical cover.

6. The digital home electronic device of claim 4, wherein the physical switch unit has an initial setting according to which the selection unit selects the one correspondence data.

7. A method for operating a digital home electronic device connected to a local network and receiving commands from devices connected to the local network or devices connected to a public network, the method comprising:

storing a plurality of correspondence data each formed by correlating each command with one piece of target device information, wherein the target information indicates source devices permitted to send the correlated commands respectively in the correspondence data, the commands are classified according to classification information describing prescribed criteria in the correspondence data, and the source devices indicate nodes checked by the digital home electronic device in advance, as trustworthy nodes in the local network and/or the public network;

selecting the correspondence data desired by a user, among the plurality of the correspondence data, according to a switching operation of the user;

judging whether or not to execute a received command according to the received command, a source information indicating a source device which sends the received command, and the correspondence data selected by the selection unit, by judging whether the source information and one particular piece of the target device information correlated with the received command in the correspondence data coincide or not; and carrying out a prescribed operation according to the received command in a case in which the received command is executed, the prescribed criteria including at least one criterion indicating whether or not an execution of a command by the digital home electronic network is dangerous to a human life or safety.

8. A computer program product for causing a computer to function as a digital home electronic device connected to a local network and receiving commands from devices connected to the local network or devices connected to a public network, the computer program product comprising:

a first computer program code for causing the computer to store a plurality of correspondence data each formed by correlating each command with one piece of target device information, wherein the target device information indicates set of source devices permitted to send the correlated commands respectively in the correspondence data, the commands are classified according to classification information describing prescribed criteria in the correspondence data, and the source devices indicate nodes checked by the digital home electronic device in advance, as trustworthy nodes in the local network and/or the public network;

a second computer program code for causing the computer to select the correspondence data desired by a user, among the plurality of the correspondence data, according to a switching operation of the user;

a third computer program code for causing the computer to judge whether or not to execute a received command according to the received command, source information indicating a source device which sends the received command, and the correspondence data selected by the selection unit, by judging whether the source information and one particular piece of the target device information correlated with the received command in the correspondence data coincide or not; and a fourth computer program code for causing the computer to carry out a prescribed operation according to the received command in a case in which the received command is executed, the prescribed criteria including at least one criterion indicating whether or not an execution of a command by the digital home electronic network is dangerous to a human life or safety.

* * * * *